(12) United States Patent
Rahman et al.

(10) Patent No.: US 10,103,798 B2
(45) Date of Patent: Oct. 16, 2018

(54) METHOD AND APPARATUS TO ENABLE CHANNEL COMPRESSION IN ADVANCED WIRELESS COMMUNICATION SYSTEMS

(71) Applicant: Samsung Electronics Co., Ltd., Gyeonggi-do (KR)

(72) Inventors: Md. Saifur Rahman, Plano, TX (US); Eko Onggosanusi, Coppell, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/698,560

(22) Filed: Sep. 7, 2017

(65) Prior Publication Data

US 2018/0076871 A1 Mar. 15, 2018

Related U.S. Application Data

(60) Provisional application No. 62/394,320, filed on Sep. 14, 2016.

(51) Int. Cl.
H04B 17/24 (2015.01)
H04B 7/06 (2006.01)

(52) U.S. Cl.
CPC ......... *H04B 7/0626* (2013.01); *H04B 7/0634* (2013.01)

(58) Field of Classification Search
CPC ............................ H04B 7/0626; H04L 1/0026
See application file for complete search history.

(56) References Cited

U.S. PATENT DOCUMENTS

2016/0134342 A1* 5/2016 Kneckt ............... H04B 7/0452
375/267

OTHER PUBLICATIONS

"3rd Generation Partnership Project; Technical Specification Group Group Services and System Aspects; Feasibility Study on New Services and Markets Technology Enablers; Stage 1 (Release 14)," 3GPP TR 22.891, V1.2.0, Nov. 2015, 96 pages.

(Continued)

*Primary Examiner* — Kevin Kim

(57) ABSTRACT

A method of a user equipment (UE) for a channel state information (CSI) feedback in a wireless communication system. The method comprises receiving, from a base station (BS), CSI feedback configuration information for the CSI feedback including a spatial channel information (SCI) indicator for each subband (SB), wherein the SCI indicator indicates a SCI associated with the downlink (DL) channel matrix; determining a CSI matrix $H_{K,N}$ comprising a dimension K×N based on the CSI feedback configuration information, where K indicates a number of SBs and N indicates a number of components of the SCI; identifying, based on the CSI matrix $H_{K,N}$, the SCI indicator that indicates a first set of d basis vectors comprising a dimension K×1, a second set of d basis vectors comprising a dimension N×1, and a set of d coefficients, and transmitting, to the BS, the CSI feedback including the identified SCI indicator indicating the first set of d basis vectors, the second set of d basis vectors, and a set of d coefficients over an uplink channel.

20 Claims, 15 Drawing Sheets

(56) References Cited

OTHER PUBLICATIONS

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.0.0, Dec. 2015, 121 pages.
"LTE; Evolved Universal Terrestrial Radio Access (E-UTRA); Physical Channels and Modulation (3GPP TS 36.211 Version 13.0.0 Release 13)," ETSI TS 136 211, V13.0.0, Jan. 2016, 143 pages.
"LTE; Evolved Universal Terrestrial Radio Access (E-UTRA); Physical Layer Procedures (3GPP TS 36.213 Version 13.0.0 Release 13)," ETSI TS 136 213, V13.0.0, May 2016, 328 pages.
"LTE; Evolved Universal Terrestrial Radio Access (E-UTRA); Medium Access Control (MAC) Protocol Specification (3GPP TS 36.321 Version 13.0.0 Release 13)," ETSI TS 136 321, V13.0.0, Feb. 2016, 84 pages.
"LTE; Evolved Universal Terrestrial Radio Access (E-UTRA); Radio Resource Control (MAC) Protocol Specification (3GPP TS 36.331 Version 13.0.0 Release 13)," ETSI TS 136 331, V13.0.0, Jan. 2016, 670 pages.

\* cited by examiner

METHOD AND APPARATUS TO ENABLE CHANNEL COMPRESSION IN ADVANCED WIRELESS COMMUNICATION SYSTEMS

CROSS-REFERENCE TO RELATED APPLICATIONS AND CLAIM OF PRIORITY

The present application claims priority to U.S. Provisional Patent Application Ser. No. 62/394,320, filed on Sep. 14, 2016, entitled "Method and Apparatus to Enable Channel Compression in Advanced Wireless Communication Systems." The content of the above-identified patent document is incorporated herein by reference.

TECHNICAL FIELD

The present application relates generally to CSI acquisition at an eNB in advanced communication systems. More specifically, this disclosure relates to explicit CSI acquisition to represent the channel in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for a channel state information (CSI) feedback in a wireless communication system is provided. The UE comprises a transceiver configure to receive, from a base station (BS), a CSI feedback configuration information for the CSI feedback including a spatial channel information (SCI) indicator for each subband (SB), wherein the SCI indicator indicates a SCI associated with the downlink (DL) channel matrix. The UE further comprises at least one processor configured to determine a CSI matrix $H_{K,N}$ comprising a dimension K×N based on the CSI feedback configuration information, where K indicates a number of SBs and N indicates a number of components of the SCI; identify, based on the CSI matrix $H_{K,N}$, the SCI indicator that indicates a first set of d basis vectors comprising a dimension K×1, a second set of d basis vectors comprising a dimension N×1, and a set of d coefficients. The UE further comprises the transceiver configured to transmit, to the BS, the CSI feedback including the identified SCI indicator indicating the first set of d basis vectors, the second set of d basis vectors, and a set of d coefficients over an uplink channel.

In another embodiment, a base station (BS) for a channel state information (CSI) feedback in a wireless communication system is provided. The BS comprises a transceiver configured to: transmit, to a user equipment (UE), a CSI feedback configuration information for the CSI feedback including a spatial channel information indicator (SCI) for each subband (SB), wherein the SCI indicator indicates a SCI associated with the downlink (DL) channel matrix; and receive, from the UE, the CSI feedback including the identified SCI indicator indicating the first set of d basis vectors, the second set of d basis vectors, and a set of d coefficients over an uplink channel, wherein a CSI matrix $H_{K,N}$ comprises a dimension K×N based on the CSI feedback configuration information, where K indicates a number of SBs and N indicates a number of components of the SCI indicator, and wherein, based on the CSI matrix $H_{K,N}$, the SCI indicator that indicates a first set of d basis vectors comprising a dimension K×1, a second set of d basis vectors comprising a dimension N×1, and a set of d coefficients.

In yet another embodiment, a method of a user equipment (UE) for a channel state information (CSI) feedback in a wireless communication system is provided. The method comprises receiving, from a base station (BS), a CSI feedback configuration information for the CSI feedback including a spatial channel information (SCI) indicator for each subband (SB), wherein the SCI indicator indicates a SCI associated with the downlink (DL) channel matrix; determining a CSI matrix $H_{K,N}$ comprising a dimension K×N based on the CSI feedback configuration information, where K indicates a number of SBs and N indicates a number of components of the SCI; identifying, based on the CSI matrix $H_{K,N}$, the SCI indicator that indicates a first set of d basis vectors comprising a dimension K×1, a second set of d basis vectors comprising a dimension N×1, and a set of d coefficients; and transmitting, to the BS, the CSI feedback including the identified SCI indicator indicating the first set of d basis vectors, the second set of d basis vectors, and a set of d coefficients over an uplink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation (REF 1);" 3GPP TS 36.212 v13.0.0, "E-UTRA, Multiplexing and Channel coding; (REF 2);" 3GPP TS 36.213 v13.0.0, "E-UTRA, Physical Layer Procedures (REF 3);" 3GPP TS 36.321 v13.0.0, "E-UTRA, Medium Access Control (MAC) protocol specification (REF 4);" 3GPP TS 36.331 v13.0.0, "Radio Resource Control (RRC) Protocol Specification (REF 5);" and 3GPP TR 22.891 v1.2.0, "Technical Specification Group Services and System Aspects; Feasibility Study on New Services and Markets Technology; Enablers; Stage 1; (Release 14)."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
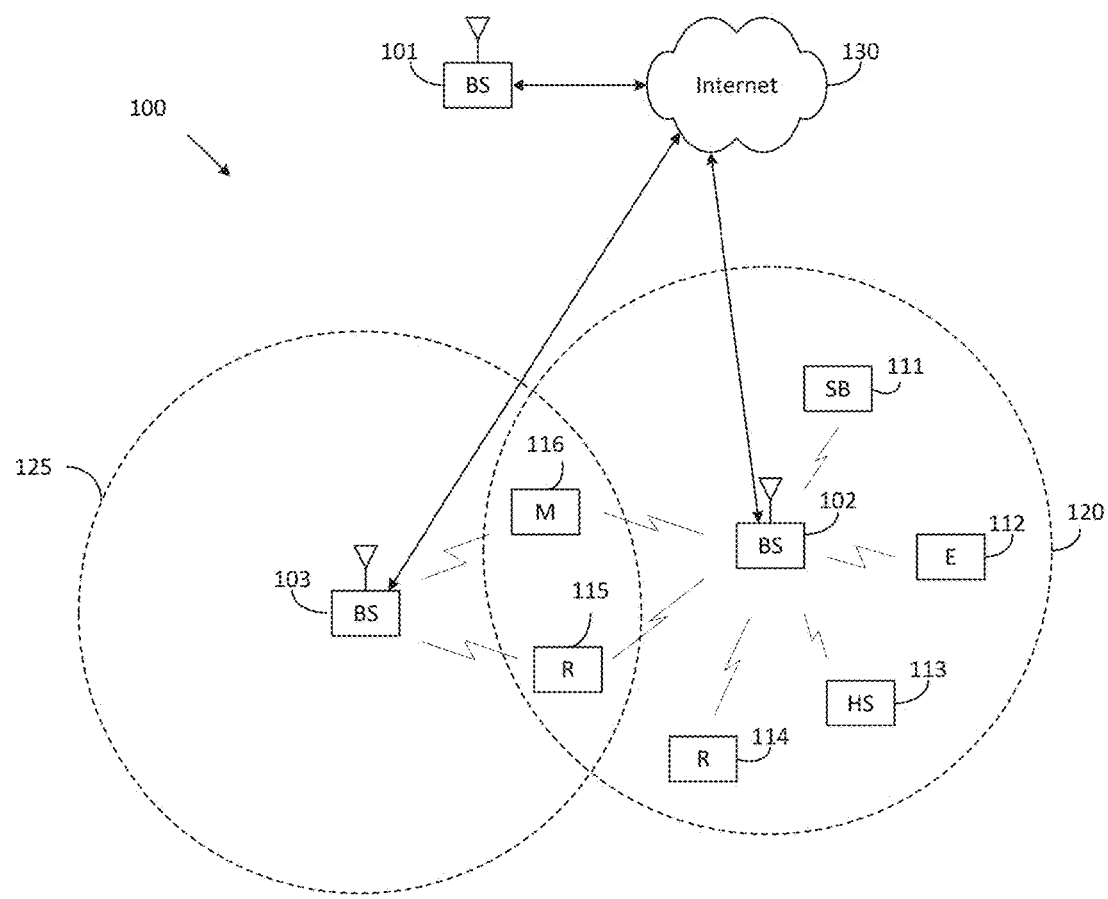
FIG. 1 illustrates an example wireless network according to embodiments of the present disclosure.
Figure 2:
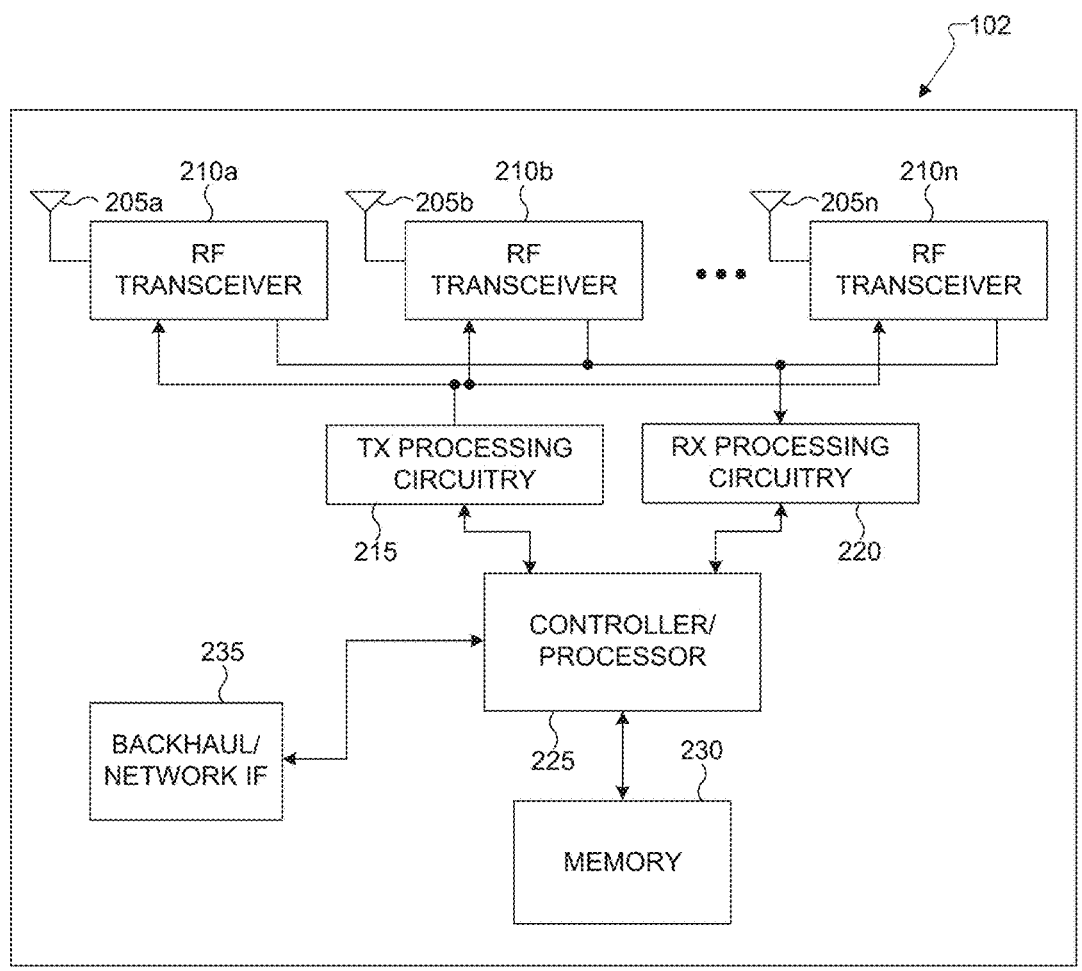
FIG. 2 illustrates an example eNB according to embodiments of the present disclosure.
Figure 3:
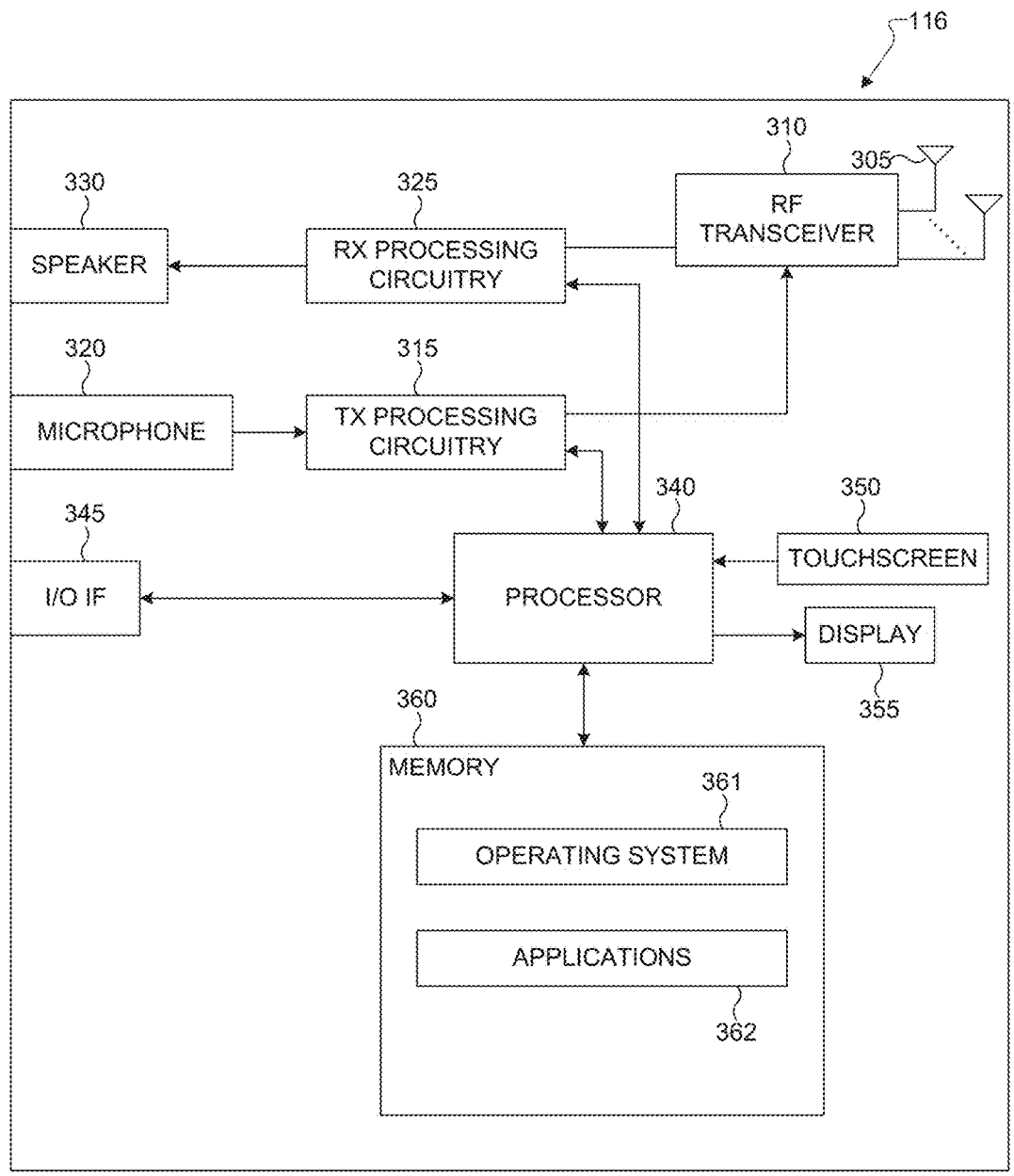
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting CSI feedback configuration information for the CSI feedback including a spatial channel information indicator for each subband (SB). In such embodiment, the spatial channel information indicator comprises at least one of a downlink channel matrix, a covariance matrix of the downlink channel matrix, or an eigenvector of the covariance matrix of the downlink channel matrix.

In some embodiments, the RF transceiver 210a-201n is capable of receiving the CSI feedback including the spatial channel information indicator indicating $U_d$, $V_d$, and $\Sigma_d$ over an uplink channel and a first CSI feedback including the first spatial channel information indicator indicating $U_{d_1}$, $V_{d_1}$, and $\Sigma_{d_1}$ and, over either the first uplink channel or a second uplink channel, a second CSI feedback including the second spatial channel information indicator indicating $U_{d_2}$, $V_{d_2}$, and $\Sigma_{d_2}$.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving CSI feedback configuration information for the CSI feedback including a spatial channel information indicator for each subband (SB). In such embodiments, the spatial channel information indicator comprises at least one of a downlink channel matrix, a covariance matrix of the downlink channel matrix, or an eigenvector of the covariance matrix of the downlink channel matrix.

In some embodiments, the RF transceiver 310 is capable of transmitting the CSI feedback including the spatial channel information indicator indicating $U_d$, $V_d$, and $\Sigma_d$ over an uplink channel and, over a first uplink channel, a first CSI feedback including the first spatial channel information indicator indicating $U_{d_1}$, $V_{d_1}$, and $\Sigma_{d_1}$ and, over either the first uplink channel or a second uplink channel, a second CSI feedback including the second spatial channel information indicator indicating $U_{d_2}$, $V_{d_2}$, and $\Sigma_{d_2}$.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of determining a CSI matrix $H_{K,N}$ comprising a dimension K×N based on the CSI feedback configuration information, identifying, based on the CSI matrix $H_{K,N}$, the spatial channel information indicator.

In some embodiments, the processor 340 is also capable of identifying the spatial channel information indicator based on a set of d triples $\{(u_i, v_i, \sigma_i): 0 \leq i \leq d-1\}$, the spatial channel information indicator based on a set of d pairs $\{(w_i, \sigma_i): 0 \leq i \leq d-1\}$, the spatial channel information indicator based on a triple of matrices $(U_d, V_d, \Sigma_d)$, and identifying the spatial channel information indicator based on a codebook for at least one of $U_d$, $V_d$, or $\Sigma_d$.

In some embodiments, the processor 340 is also capable of identifying a first spatial channel information indicator indicating $U_{d_1}$, $V_{d_1}$, and $\Sigma_{d_1}$, based on a first CSI matrix $H_{K,N}^{(1)}$ and a second spatial channel information indicator indicating $U_{d_2}$, $V_{d_2}$, and $\Sigma_{d_2}$ based on a difference $H_{K,N}^{(2)} - \tilde{H}_{K,N}^{(1)}$ between a second CSI matrix $H_{K,N}^{(2)}$ and a representation $\hat{H}_{K,N}^{(1)}$ of the first CSI matrix $H_{K,N}^{(1)}$ according to the first spatial channel information indicator.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
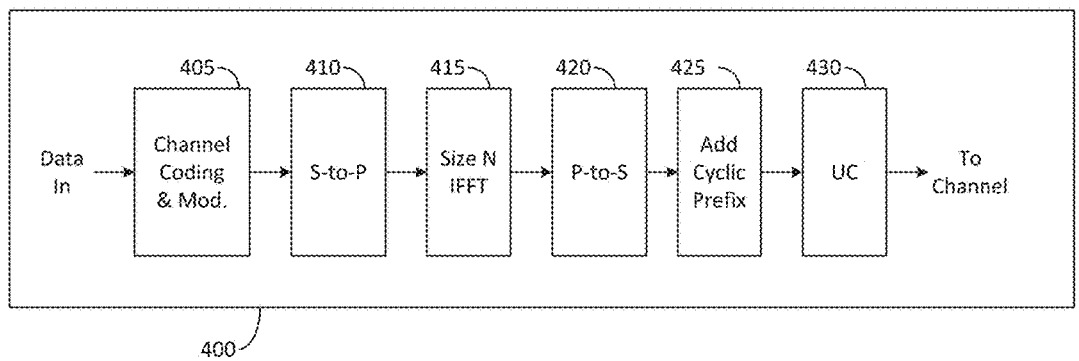
FIG. 4A illustrates an example high-level diagram of an orthogonal frequency division multiple access transmit path according to embodiments of the present disclosure.
Figure 4B:
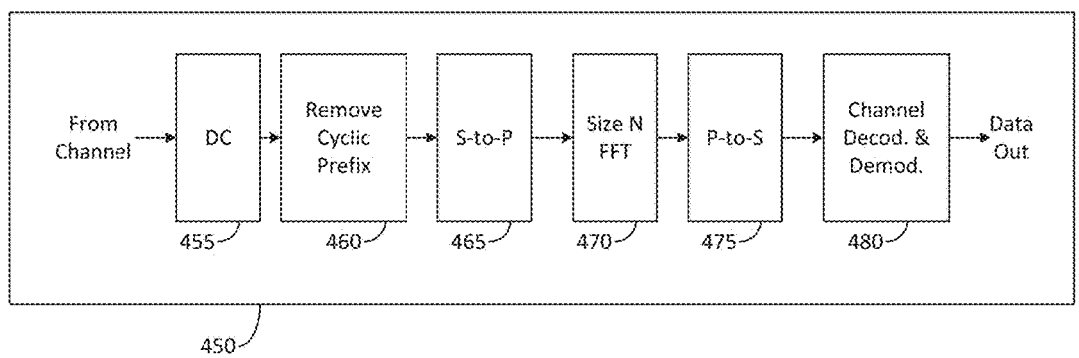
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE specification precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission scheme wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE"s data transmission/reception.

Figure 5:
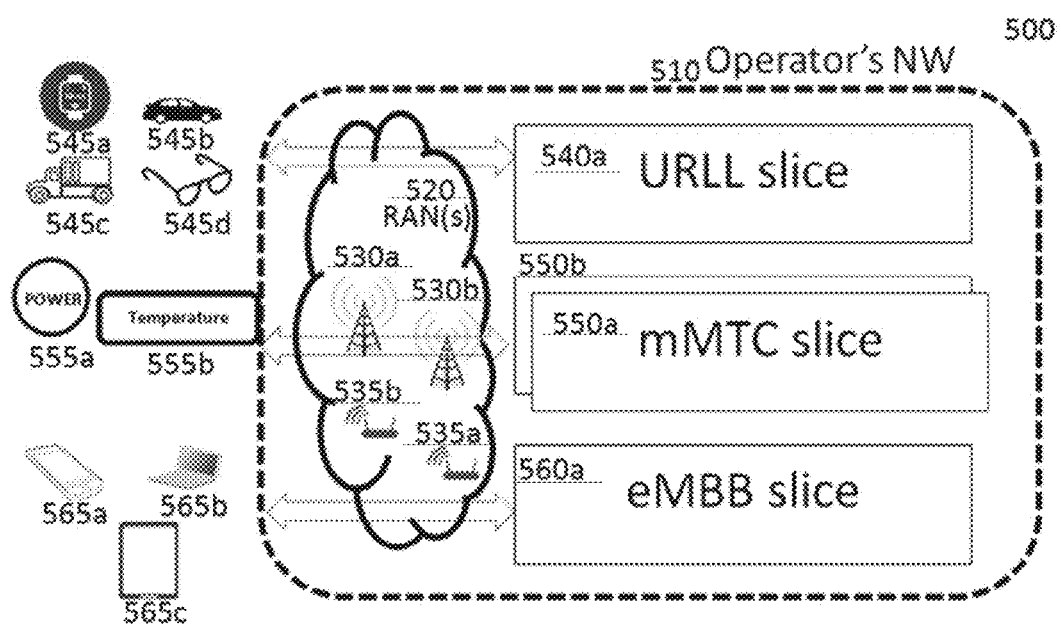
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a method to cope with various different qualities of services (QoS) in the network level. For supporting these various QoS efficiently, slice-specific PHY optimization may also be necessary. Devices 545*a/b/c/d*, 555*a/b* are 565*a/b/c* examples of user equipment (UE) of different types. The different types of user equipment (UE) shown in FIG. 5 are not necessarily associated with particular types of slices. For example, the cell phone 565*a*, the laptop 565*b* and the tablet 565*c* are associated with the eMBB slice 560*a*, but this is just for illustration and these devices can be associated with any types of slices.

In some embodiments, one device is configured with more than one slice. In one embodiment, the UE, (e.g., 565*a/b/c*) is associated with two slices, the URLL slice 540*a* and the eMBB slice 560*a*. This can be useful for supporting online gaming application, in which graphical information are transmitted through the eMBB slice 560*a*, and user interaction related information are exchanged through the URLL slice 540*a*.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
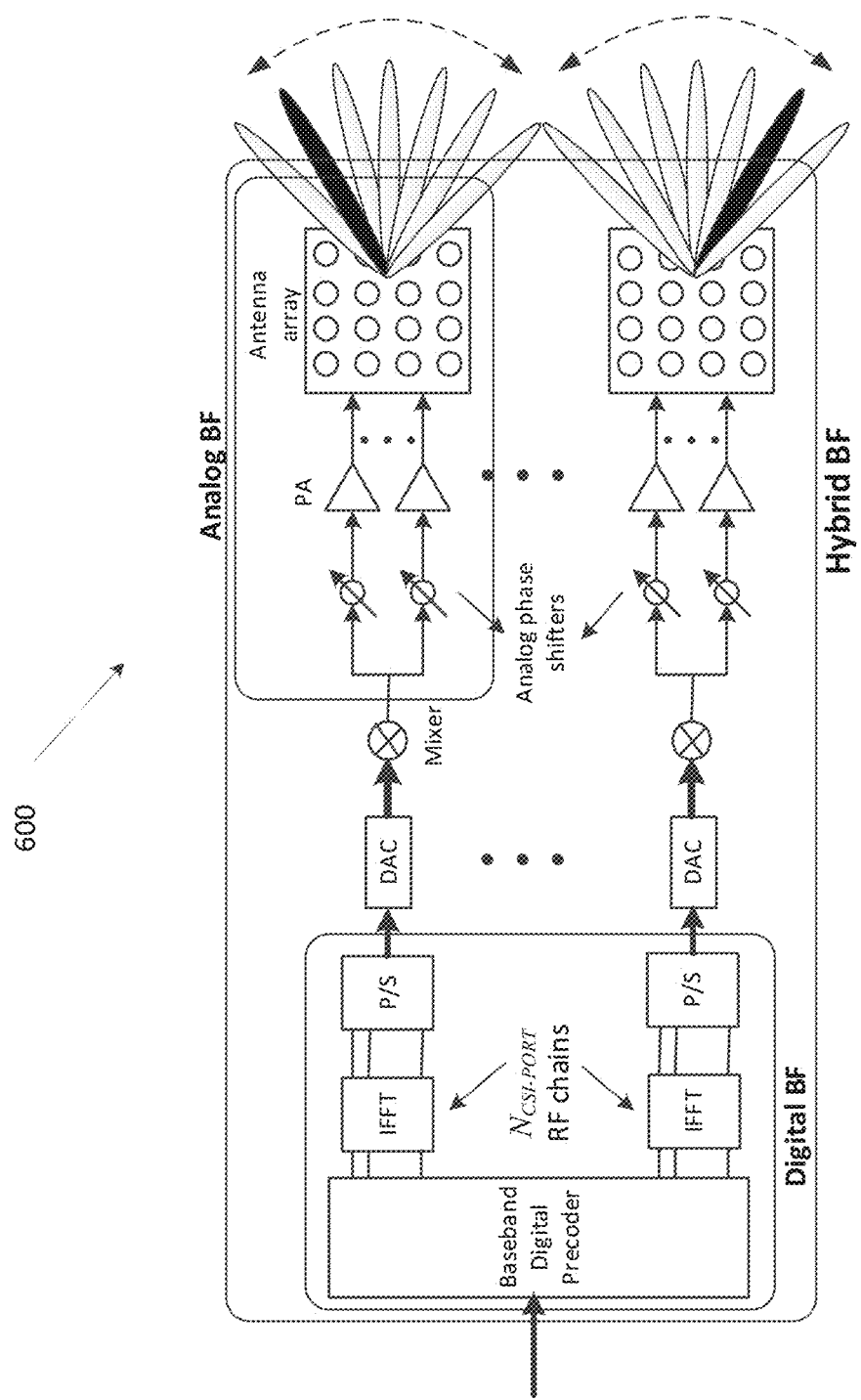
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, an efficient design of CSI-RS is a crucial factor. For this reason, three types of CSI reporting mechanism corresponding to three types of CSI-RS measurement behavior are supported in LTE specification) "CLASS A" CSI reporting which corresponds to non-precoded CSI-RS, 2) "CLASS B" reporting with K=1 CSI-RS resource which corresponds to UE-specific beamformed CSI-RS, 3) "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation of the DL-long-term channel statistics). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification for eFD-MIMO, MIMO has been identified as an essential feature in order to achieve high system throughput requirements and MIMO may continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB, and CSI acquisition and feedback from UE. In legacy (up to LTE specification) FDD systems, the CSI feedback framework is "implicit" in the form of CQI/PMI/RI (and CRI in the LTE specification) derived from a codebook assuming SU transmission from eNB. Because of the inherent SU assumption while deriving CSI, this implicit CSI feedback is inadequate for MU transmission.

Since future (e.g. NR) systems are likely to be more MU-centric, this SU-MU CSI mismatch may be a bottleneck in achieving high MU performance gains. Another issue with implicit feedback is the scalability with larger number of antenna ports at eNB. For large number of antenna ports, the codebook design for implicit feedback is quite complicated (for example, in the LTE specification, the total number of Class A codebooks=44), and the designed codebook is not guaranteed to bring justifiable performance benefits in practical deployment scenarios (for example, only a small percentage gain can be shown at the most). Realizing aforementioned issues, RAN1 has agreed to provide specification support to advanced CSI reporting in the LTE specification of eFD-MIMO, which, at the very least, can serve as a good starting point to design advanced CSI scheme in NR MIMO.

Figure 7:
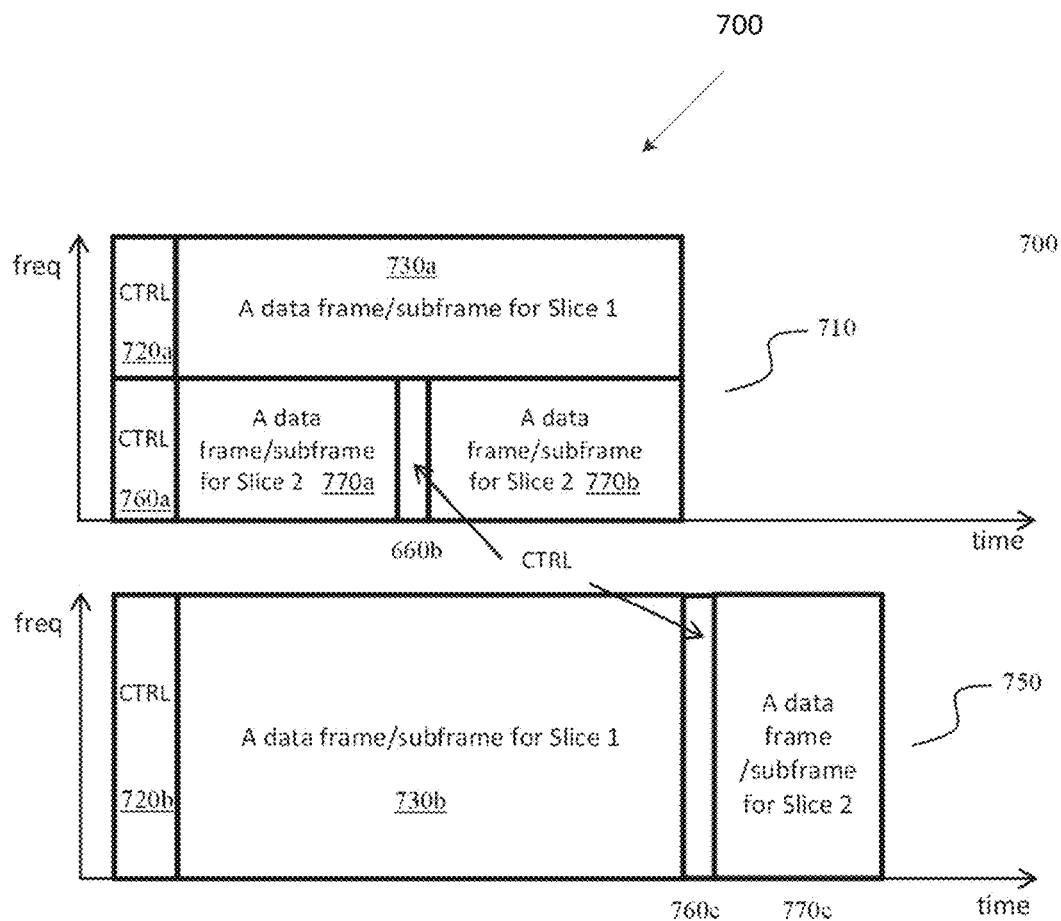
FIG. 7 illustrates an example multiplexing two slices according to embodiments of the present disclosure.

FIG. 7 illustrates an example multiplexing two slices 700 according to embodiments of the present disclosure. An embodiment of the multiplexing two slices 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

To utilize PHY resources efficiently and multiplex various slices (with different resource allocation schemes, numerologies, and scheduling strategies) in DL-SCH, a flexible and self-contained frame or subframe design is utilized. Two exemplary instances of multiplexing two slices within a common subframe or frame are depicted in FIG. 7. In FIG. 7, a slice can be composed of one or two transmission instances where one transmission instance consists of a control (CTRL) component (720a, 760a, 760b, 720b, and 760c) and a data component (730a, 770a, 770b, 730b, and 770c). In FIG. 7, the two slides (e.g., 710) are multiplexed in frequency domain whereas slices are multiplexed in time domain (e.g., 750).

Compared to LTE specification, the CSI acquisition for NR MIMO may consider the following additional differentiating factors. In one example of increased number of antenna ports for NR MIMO, the number of antenna elements at the eNB can be up to 256, which means that the total number of antenna ports can be more than 32, which is the maximum number of antenna ports supported in LTE specification. Although this can be accommodated with partial-port CSI-RS mapping where each subset consists of at most 32 ports, the total number of ports across time can be extended to a much larger number. As the number of ports increases, meaningful system gain can only be obtained in a MU-centric system.

In another example of increased throughput requirement, the system throughput requirements (e.g. for eMBB in NR) is several times more than that for LTE specification eFD-MIMO. Such high throughput requirements can only met with a mechanism to provide very accurate CSI to the eNB.

In yet another example of beamforming, FD-MIMO and NR MIMO system may be beam-formed either cell-specifically or UE-specifically, where the beams can either be of analog (RF) or digital or hybrid type. For such a beam-formed system, a mechanism is needed to obtain accurate beam-forming information at the eNB.

In yet another example of Unified design, since NR includes both above and below 6 GHz frequency bands, a unified MIMO framework working for both frequency regimes may be preferable.

In view of the aforementioned embodiments with the implicit feedback paradigm and the additional differentiating factors specific with NR MIMO, it may be observed that the implicit CSI feedback scheme alone is not enough for NR MIMO, and hence advanced CSI is needed.

In some embodiment 0, a UE is configured to report "explicit CSI" such as channel, dominant eigenvectors, and covariance matrix for each subband (SB) based on compression techniques such as principal component analysis (PCA) in order to exploit correlation in spatial (across antennas) and frequency (across SBs) domains jointly, where a SB corresponds to multiple (p) consecutive PRBs and the number p depends on the system bandwidth (BW), for example, p=6 for 20 MHz BW.

Figure 8:
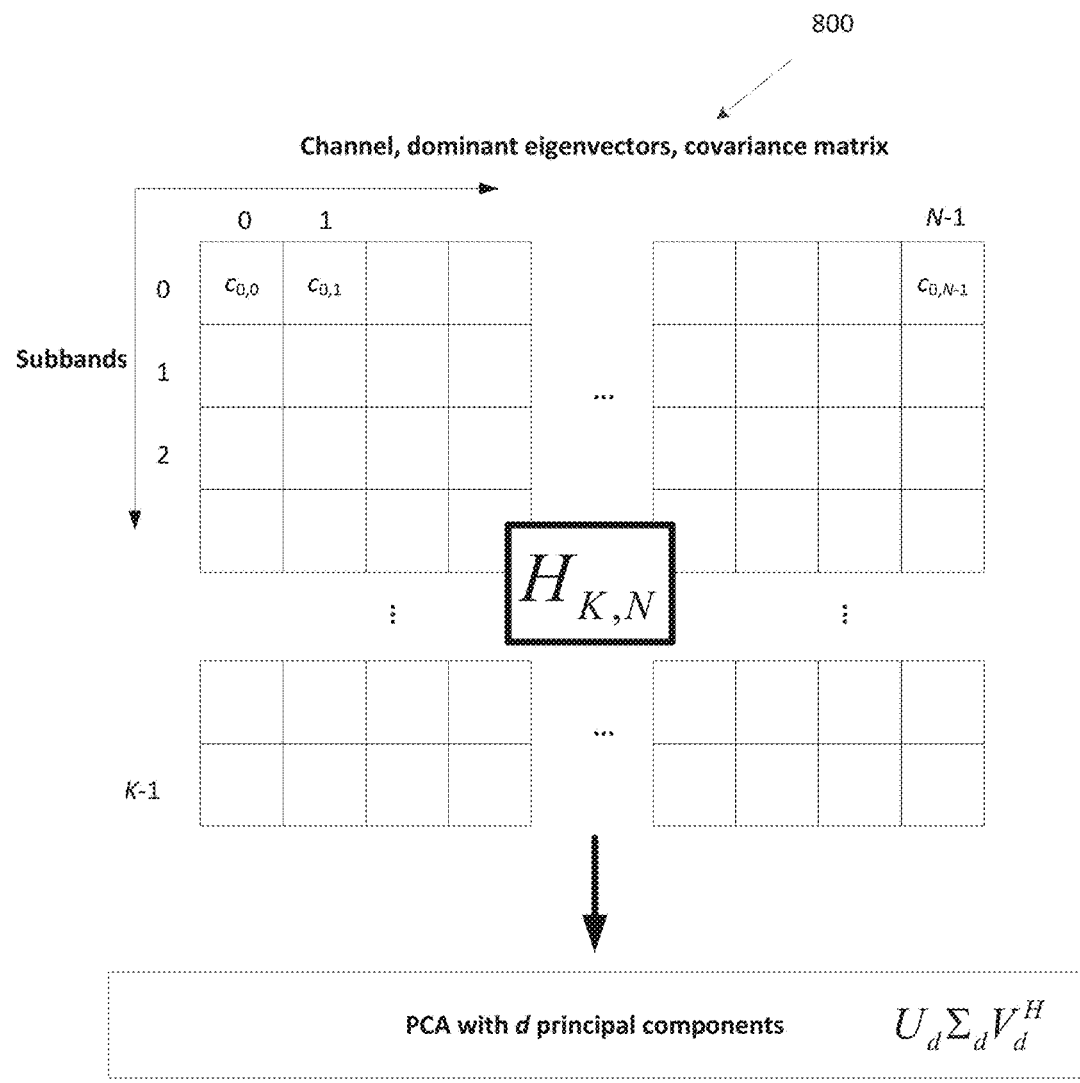
FIG. 8 illustrates an example explicit CSI matrix and PCA based compression according to embodiments of the present disclosure.

FIG. 8 illustrates an example explicit CSI matrix and PCA 800 based compression according to embodiments of the present disclosure. An embodiment of the explicit CSI matrix and PCA 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

An illustration of the proposed PCA based explicit CSI compression is shown in FIG. 8. Let N be the number of explicit CSI components that need to be reported in each SB. The number N depends on the explicit CSI type as follows: Channel: $N=2N_1N_2 \times N_r \times k$, Eigenvectors: $N=2N_1N_2 \times r$, and Covariance matrix: $N=2N_1N_2 \times 2N_1N_2$, where $2N_1N_2$ is the number of antenna ports at eNB (or gNB), $N_r$ is the number of antennas at the UE, r is the number of dominant eigenvectors, and k is the number of subcarriers in a SB for which the DL channel is explicitly reported.

Let K be the number of SBs for explicit CSI reporting. The UE estimates/measures/derives the un-quantized or analog explicit CSI using DL measurement RS (e.g. CSI-RS) for each SB, then constructs a K×N explicit CSI matrix as:

$$H_{K,N} = \begin{bmatrix} c_{0,0} & c_{0,1} & \cdots & c_{0,N-1} \\ c_{1,0} & c_{1,1} & \cdots & c_{1,N-1} \\ \vdots & \vdots & \ddots & \vdots \\ c_{K-1,0} & c_{K-1,1} & \cdots & c_{K-1,N-1} \end{bmatrix},$$

where $c_{s,l}$ corresponds to the l-th explicit CSI component for SB s. The singular value decomposition of $H_{K,N}$ is performed to represent: $H_{K,N}=U\Sigma V^H=\Sigma_{i=0}^{D-1}\sigma_i u_i v_i^H$, where $U=[u_0\ u_1\ \ldots\ u_{K-1}]$, is the left eigenvector matrix (columns are length-K eigenvectors), $V=[v_0\ v_1\ \ldots\ v_{N-1}]$ is the right eigenvector matrix (columns are length-N eigenvectors), $\Sigma=\text{diag}([\sigma_0\ \sigma_1\ \ldots\ \sigma_{D-1}])$ is a diagonal matrix of singular values sorted as $\sigma_0 \geq \sigma_1 \geq \ldots \geq \sigma_{D-1}$, and D=min(K,N). Then, d principal components where $1 \leq d < D$ corresponding to "dominant" singular values $\sigma_0, \ldots \sigma_{d-1}$ and corresponding left and right eigenvector matrices are constructed as: $U_d=[u_0\ u_1\ \ldots\ u_{d-1}]$; $V_d=[v_0\ v_1\ \ldots\ v_{d-1}]$; and $\Sigma_d=\text{diag}([\sigma_0\ \sigma_1\ \ldots\ \sigma_{d-1}])$. The reduced dimensional or compressed explicit CSI matrix is then given by $H_{K,N} \approx \tilde{H}_{K,N}=U_d\Sigma_d V_d^H=\Sigma_{i=0}^{d-1}\sigma_i u_i v_i^H$.

To report compressed $H_{K,N}$, the UE uses one of the following alternatives. In one example of Alt 0, the UE transforms the explicit CSI matrix $H_{K,N}$ as $R_d=H_{K,N}V_d$, quantizes $R_d$ and $V_d$ using a codebook, and then reports the quantized matrices to the eNB, which reconstructs the explicit CSI matrix as $H_{K,N}=R_d V_d^H$. In another example of Alt 1, the UE quantizes $U_d$, $V_d$, and $\Sigma_d$ using a codebook, and then reports them to the eNB, which reconstructs the explicit CSI matrix as $H_{K,N}=U_d\Sigma_d V_d^H$. In the rest of the current disclosure, Alt 1 is assumed for explicit CSI reporting. The present disclosure, however, are general and are applicable to Alt 0.

Considering real and imaginary parts of complex numbers separately as two real numbers, the total number of reported (real) explicit CSI components is 2d (K+N)+R, where R=0 for Alt 0 and R=d for Alt 1. So, the total compression achieved before quantization is $$\frac{2KN}{2d(K+N)+R}.$$

In one embodiment, the d value is configured to the UE, e.g. via higher-layer RRC signaling. In another method, the UE reports a preferred d value in the CSI report. In another method, the preferred d value is fixed, for example to 1.

In some embodiments of 0-0, in addition to explicit CSI, the UE is also configured to report CQI or/and RI. In one example, the UE is configured to report both CQI and RI. For instance, if the UE is configured to report the explicit CSI type "dominant eigenvectors," then the UE can also be configured to report both CQI and RI. In another example, the UE is configured to report only CQI. For instance, if the UE is configured to report the explicit CSI type "channel" or "covariance matrix," then the UE can also be configured to report CQI only. In this example, the rank (RI) for the reported CQI is pre-determined, for example rank=1, or configured. In yet another example, the UE can be configured to report only RI.

Figure 9:
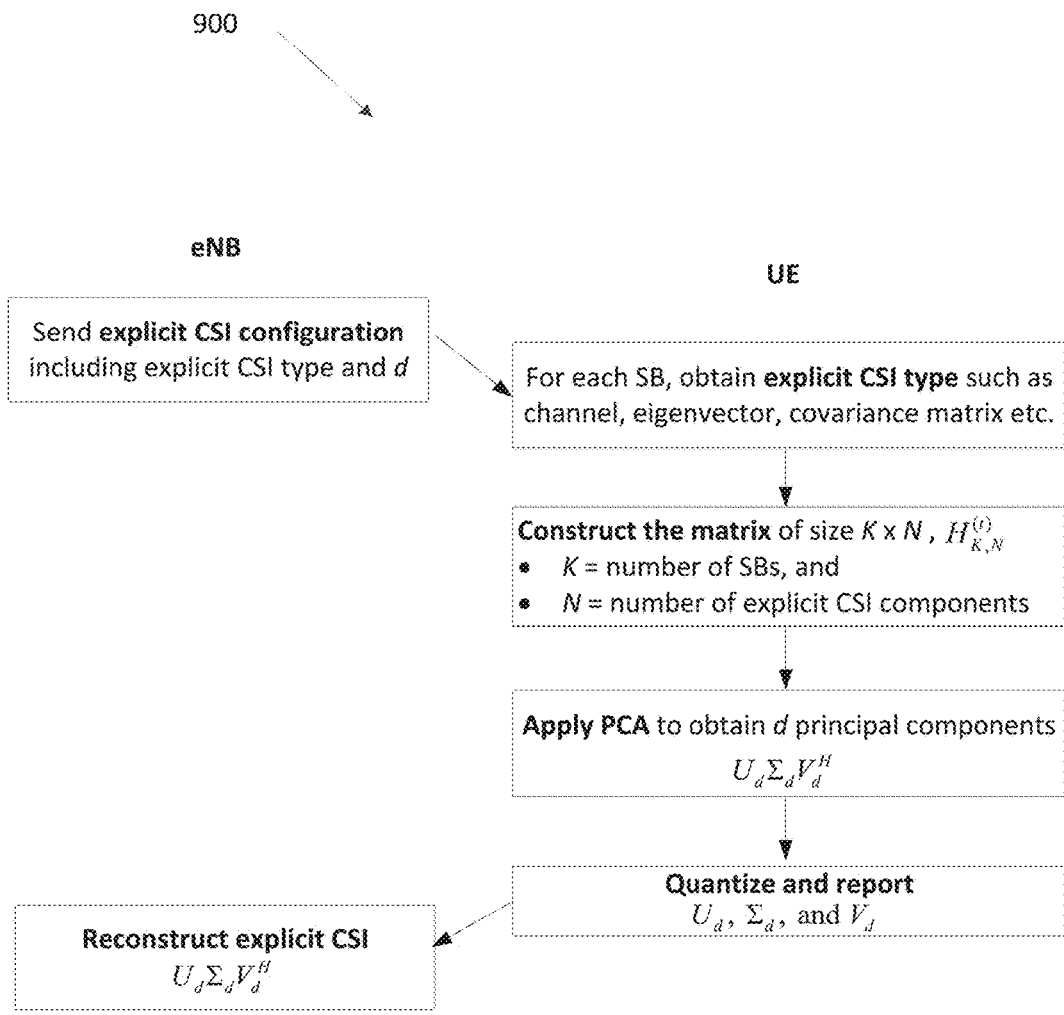
FIG. 9 illustrates an example PCA based explicit CSI feedback reporting according to embodiments of the present disclosure.

FIG. 9 illustrates an example PCA 900 based explicit CSI feedback reporting according to embodiments of the present disclosure. An embodiment of the PCA 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In some embodiments 0-1, the explicit CSI reporting according to the proposed PCA based explicit CSI compression is shown in FIG. 9 (e.g., Alt 1). The eNB (or gNB) sends the explicit CSI configuration to the UE which includes the explicit CSI type (channel, eigenvector, covariance matrix) and the number of principal components (d value). In one example of response, the UE derives explicit CSI of the configured type for each SB in which the UE is configured to report explicit CSI. In another example of response, the UE constructs the explicit CSI matrix $H_{K,N}$ as explained in the aforementioned embodiments 0. In another example of response the UE applies PCA to obtain d principal components $U_d$, $V_d$, and $\Sigma_d$. In yet another example of response, the UE finally quantizes (using a codebook) and reports d principal components. The eNB (or gNB) reconstructs the explicit CSI for K SBs as $H_{K,N}=U_d\Sigma_d V_d^H$.

In some embodiments 1, a UE is configured with a codebook for separate quantization of: columns of $U_d=[u_0 \; u_1 \ldots u_{d-1}]$; columns of $V_d=[v_0 \; v_1 \ldots v_{d-1}]$; and diagonal elements of $\Sigma_d=\text{diag}([\sigma_0 \; \sigma_1 \ldots \sigma_{d-1}]$ according to the following embodiments.

In some embodiments 1-0, a UE is configured with a unit-magnitude scalar codebook to quantize scalar components $u_{m,n}$ and $v_{l,k}$ of orthogonal matrices $U_d$ and $V_d$, respectively, where m, l∈{0, 1, ..., d−1}, n∈{0, 1, ..., K−1}, and k∈{0, 1, ..., N−1}, according to one or combinations of the following codebook alternatives. In one example of common codebook, a common scalar codebook is used to quantize the scalar components $u_{m,n}$ and $v_{l,k}$ of $U_d$ and $V_d$. An example of such a codebook is a uniform codebook over (0, 1). In another example of separate codebook, the scalar components $u_{m,n}$ and $v_{l,k}$ of $U_d$ and $V_d$ are quantized using two separate scalar codebooks or a pair of scalar codebooks. An example of such scalar codebooks is a uniform codebook over (0, 1). In yet another example of real codebook, a real scalar codebook is used to quantize real and imaginary parts of complex components of $U_d$ and $V_d$ separately as two real numbers. An example of such a codebook is a uniform codebook over (0, 1). In yet another example of complex codebook, a complex scalar codebook is used to quantize the complex components of $U_d$ and $V_d$.

In some embodiments 1-0A, an oversampled DFT codebook comprising DFT vectors of length K, i.e., $$\left\{[1, e^{\frac{2\pi l}{KO}}, e^{\frac{2\pi l 2}{KO}}, \ldots, e^{\frac{2\pi l(K-1)}{KO}}]: l=0, 1, \ldots, KO_K-1\right\}$$

is used to quantize the columns of $U_d$. Similarly, an oversampled DFT codebook comprising DFT vectors of length M, i.e., $$\left\{[1, e^{\frac{2\pi l}{MO_M}}, e^{\frac{2\pi l 2}{MO_M}}, \ldots, e^{\frac{2\pi l(M-1)}{MO_M}}]: l=0, 1, \ldots, MO_M-1\right\}$$

is used to quantize the columns of $V_d$. The oversampling factor can be 4 for both DFT codebooks ($O_K=O_M=4$).

In some embodiments 1-0B, a scalar amplitude codebook and a scalar phase codebook respectively are used to quantize amplitude and phase of complex components of $U_d$ and $V_d$ separately. An example of a 2-bit scalar amplitude codebook is $C_A=\{1, \sqrt{0.5}, \sqrt{0.25}, \sqrt{0.125}\}$. Another example of a 2-bit scalar amplitude codebook is $C_A=\{1, \sqrt{0.5}, \sqrt{0.25}, 0\}$. An example of a 3-bit scalar amplitude codebook is $C_A=\{1, \sqrt{0.5}, \sqrt{0.25}, \sqrt{0.125}, \sqrt{0.0625}, \sqrt{0.0313}, \sqrt{0.0156}, \sqrt{0.0078}\}$. Another example of a 3-bit scalar amplitude codebook is $C_A=\{1, \sqrt{0.5}, \sqrt{0.25}, \sqrt{0.125}, \sqrt{0.0625}, \sqrt{0.0313}, \sqrt{0.0156}, 0\}$. An example of a 2-bit scalar phase codebook is QPSK, i.e., $$\left\{e^{\frac{2\pi n}{4}}: n=0, 1, 2, 3\right\}.$$

Another example of a 3-bit scalar phase codebook is 8 PSK, i.e., $$\left\{e^{\frac{2\pi n}{8}}: n=0, 1, \ldots 7\right\}.$$

In one alternative, for each column $U_d$, amplitude and phase for all K components are quantized, and for each column of $V_d$, amplitude and phase of all M components are quantized. In another alternative, for each column $U_d$, the strongest of the K components is reported and amplitude and phase of the remaining K−1 components (after normalization with the strongest component) are quantized, and similarly, for each column of $V_d$, the strongest of the M components is reported and amplitude and phase of the remaining M−1 components (after normalization with the strongest component) are quantized.

In some embodiments 1-1, a UE is configured with a unit-norm vector codebook to quantize columns of $U_d$ and $V_d$ using two separate codebooks or a pair of vector codebooks, each of which is according to one of the following alternatives. In one example of real codebook, a real vector codebook is used to quantize real and imaginary parts (vectors) of columns of $U_d$ or $V_d$ separately as two real vectors. In another example of complex codebook, a complex vector codebook is used to quantize columns of $U_d$ or $V_d$.

In some embodiments 1-2, a UE is configured with a scalar codebook to quantize diagonal entries of $\Sigma_d$ (i.e., $\sigma_0$ $\sigma_1$ ... $\sigma_{d-1}$) using a codebook over (0, A), where A is a positive number, for example A=10. An example of such a codebook is a uniform codebook over (0, A).

Let $C_U$ and $C_V$ be codebooks for (d) left and right principal components (or singular vectors of $H_{K,N}$), $U_d$ and $V_d$, respectively, where codebook $C_U$ comprises of a set of matrices of size K×d whose columns are unit-norm and orthogonal, and codebook $C_V$ comprises of a set of matrices of size N×d whose columns are unit-norm and orthogonal.

In some embodiments 1-3a, a UE is configured with two separate codebooks $C_U$ and $C_V$ for left and right principal components $U_d$ and $V_d$, respectively, where the codebook configuration is according to one of the following alternatives. In one example, both $C_U$ and $C_V$ are fixed (hence not configured). In another example, $C_U$ is configured and $C_V$ is fixed. In yet another example, $C_U$ is fixed and $C_V$ is configured. In yet another example, both $C_U$ and $C_V$ are configured. This configuration can be via higher-layer (e.g. RRC) signaling or MAC layer (e.g. MAC CE) signaling.

The UE selects two matrices W and X, where W and X belong to $C_U$ and $C_V$, respectively, to represent/quantize $U_d$ and $V_d$ and reports the selected matrices in addition to the quantized $\Sigma_d$ (i.e., $\sigma_0$ $\sigma_1$ ... $\sigma_{d-1}$) to the eNB. There are four alternatives for (W, X) reporting. In one example, both $C_U$ and $C_V$ are singleton (i.e., comprising of one matrix), hence W and X are not reported. In another example, $C_U$ is singleton and $C_V$ is non-singleton (i.e., comprises of multiple matrices), hence W is not reported and X is reported. In yet another example, $C_U$ is non-singleton and $C_V$ is singleton, hence W is reported and X is not reported. In yet another example, both $C_U$ and $C_V$ are non-singleton, hence both W and X are reported.

Let $C_{U''}$ and $C_{V''}$ be codebooks for left and right orthogonal matrices (of $H_{K,N}$), U and V, respectively, where codebook $C_{U''}$ comprises of a set of orthonormal matrices of size K×K, and codebook $C_{V''}$ comprises of a set of orthonormal matrices of size N×N.

In some embodiments 1-3b, a UE is configured with two separate codebooks $C_{U''}$ and $C_{V''}$ for left and right orthogonal matrices U and V, respectively, where the codebook configuration is according to one of the four alternatives in the aforementioned embodiments 1-3a. This configuration can be via higher-layer (e.g. RRC) signaling or MAC layer (e.g. MAC CE) signaling. The UE selects two matrices W and X, where W and X belong to $C_{U''}$ and $C_{V''}$, respectively, to represent/quantize U and V and reports the selected matrices in addition to the quantized $\Sigma$ (i.e., $\sigma_0$ $\sigma_1$ ... ) to the eNB according to one of the four alternatives for (W, X) reporting (in the aforementioned embodiments 1-3a). Note that in this sub-embodiment, the number of principal components (i.e. the d value) does not need to be configured to the UE.

In some embodiments 1-3c, a UE is configured with at least one of two separate parameters, SubbandBasisConfig and SpatialBasisConfig, to configure $U_d$ and $V_d$, or U and V, respectively, where SubbandBasisConfig takes values such as 1, 2, ..., which represent K×d for $U_d$ or K×K for U matrices whose columns are unit-norm and orthogonal, and SpatialBasisConfig takes values such as 1, 2, ..., which represent N×d for $V_d$ or N×N for V matrices whose columns are unit-norm and orthogonal. This configuration can be via higher-layer (e.g. RRC) signaling or MAC layer (e.g. MAC CE) signaling. The UE selects two matrices W and X, depending on the configured values of SubbandBasisConfig and SpatialBasisConfig, respectively, to represent/quantize $U_d$ and $V_d$ or U and V, and reports them according to one of the four reporting alternatives in the aforementioned embodiments 1-3a.

In some embodiments 1-4a, a UE is configured with a single joint codebook pair $(C_U, C_V)$ for left and right principal component pair $(U_d, V_d)$, where the codebook configuration is according to one of the four alternatives in the aforementioned embodiments 1-3a. This configuration can be via higher-layer (e.g. RRC) signaling or MAC layer (e.g. MAC CE) signaling. The UE selects a matrix pair (W, X), which belongs to $(C_U, C_V)$, to represent/quantize $(U_d, V_d)$ and reports the selected matrix pair in addition to the quantized $\Sigma_d$ (i.e., $\sigma_0$ $\sigma_1$ ... $\sigma_{d-1}$) to the NB. There are two alternatives for (W, X) reporting. In one example, $(C_U, C_V)$ is singleton, hence (W, X) is not reported. In another example, $(C_U, C_V)$ is non-singleton, hence (W, X) is reported.

In some embodiments 1-4b, a UE is configured with a single joint codebook pair $(C_{U''}, C_{V''})$ for orthogonal matrix pair (U,V), where the codebook configuration is according to one of the four alternatives in Sub-embodiment 1-3a. This configuration can be via higher-layer (e.g. RRC) signaling or MAC layer (e.g. MAC CE) signaling. The UE selects two matrices W and X, where W and X belong to $C_{U''}$ and $C_{V''}$, respectively, to represent/quantize U and V and reports the selected matrices in addition to the quantized $\Sigma$ (i.e., $\sigma_0$ $\sigma_1$ ... ) to the eNB according to one of the two alternatives for (W, X) reporting (in the aforementioned embodiments 1-4a). Note that in this sub-embodiment, the number of principal components (i.e. the d value) does not need to be configured to the UE.

In some embodiments 1-4c, a UE is configured with a single joint parameter, BasisConfig, to configure $(U_d, V_d)$ or (U, V), where BasisConfig takes values such as 1, 2, ..., which represent pairs of: K×d (for $U_d$) or K×K (for U) matrices and N×d (for $V_d$) or N×N (for V) matrices, whose columns are unit-norm and orthogonal. This configuration can be via higher-layer (e.g. RRC) signaling or MAC layer (e.g. MAC CE) signaling. The UE selects two matrices W and X, depending on the configured value of BasisConfig, to represent/quantize $U_d$ and $V_d$ and reports them according to one of the two reporting alternatives in the aforementioned embodiments 1-4a.

In some embodiments 2, a UE is configured with a codebook pair $(C_U, C_V)$ or parameters for $(U_d, V_d)$ according to one of Sub-embodiments 1-3a to 1-4c, and the UE (instead of SVD) performs the following basis expansion in order to derive compressed or reduced dimensional explicit CSI. For each (W, X) in $(C_U, C_V)$ or according to the configured parameter, the UE solves the following least-square (LS) problem: $\min_s \|h - As\|^2$, where $h = \text{vec}(H_{K,N})$, $A = \text{vec}([w_0 x^*_0 \ w_1 x^*_1 \ ... \ w_{d-1} x^*_{d-1}])$, $W = [w_0 \ w_1 \ ... \ w_{d-1}]$, and $X = [x_0 \ x_1 \ ... \ x_{d-1}]$.

The notation vec(M) transforms matrix M into a vector by concatenating columns of M. The solution to the LS problem is given by $s^* = (A^H A)^{-1} A^H h$. The UE quantizes $s^*$ and reports $s^*$ as explicit CSI. The UE may also report a (W, X) pair in $(C_U, C_V)$ or according to the configured parameter, which achieves the minimum LS over all possible (W, X) pairs.

In some embodiments 2-0, a UE is configured with a codebook pair $(C_{U''}, C_{V''})$ or parameters for (U, V) according to one of Sub-embodiments 1-3a to 1-4c, and the UE derives and reports s* and a (W, X) pair in ($C_U$, $C_V$) or according to the configured parameter similar to the aforementioned embodiments 2, where the length of vector s* is min(K, N).

In some embodiment 3, a UE is configured with a codebook pair ($C_U$, $C_V$) or parameters for ($U_d$, $V_d$) according to one of Sub-embodiments 1-3a to 1-4c, and the UE (instead of SVD) performs the following derivation in order to derive compressed or reduced dimensional explicit CSI. For each (W, X) in ($C_U$, $C_V$) or according to the configured parameter, the UE derives S which approximates $H_{K,N} \approx WSX^H$, and optimizes one of performance metrics such as maximum power, maximum SINR and minimum quantization error, where S is a d×d diagonal matrix $$\begin{bmatrix} s_0 & 0 & 0 & 0 \\ 0 & s_1 & 0 & 0 \\ 0 & 0 & \ddots & 0 \\ 0 & 0 & 0 & s_{d-1} \end{bmatrix}$$

with non-negative diagonal elements $s_0, s_1, \ldots, s_{d-1}$. The UE quantizes $s_0, s_1, \ldots, s_{d-1}$ and reports them as explicit CSI. The UE may also report a (W, X) pair in ($C_U$, $C_V$) or according to the configured parameter, which achieves the optimal value of the considered metric over all possible (W, X) pairs.

In some embodiments 3-0, a UE is configured with a codebook pair ($C_U$, $C_V$) or parameters for (U,V) according to one of Sub-embodiments 1-3a to 1-4c, and the UE derives and reports S and a (W, X) pair in ($C_U$, $C_V$) or according to the configured parameter similar to the aforementioned embodiments 3.

Figure 10:
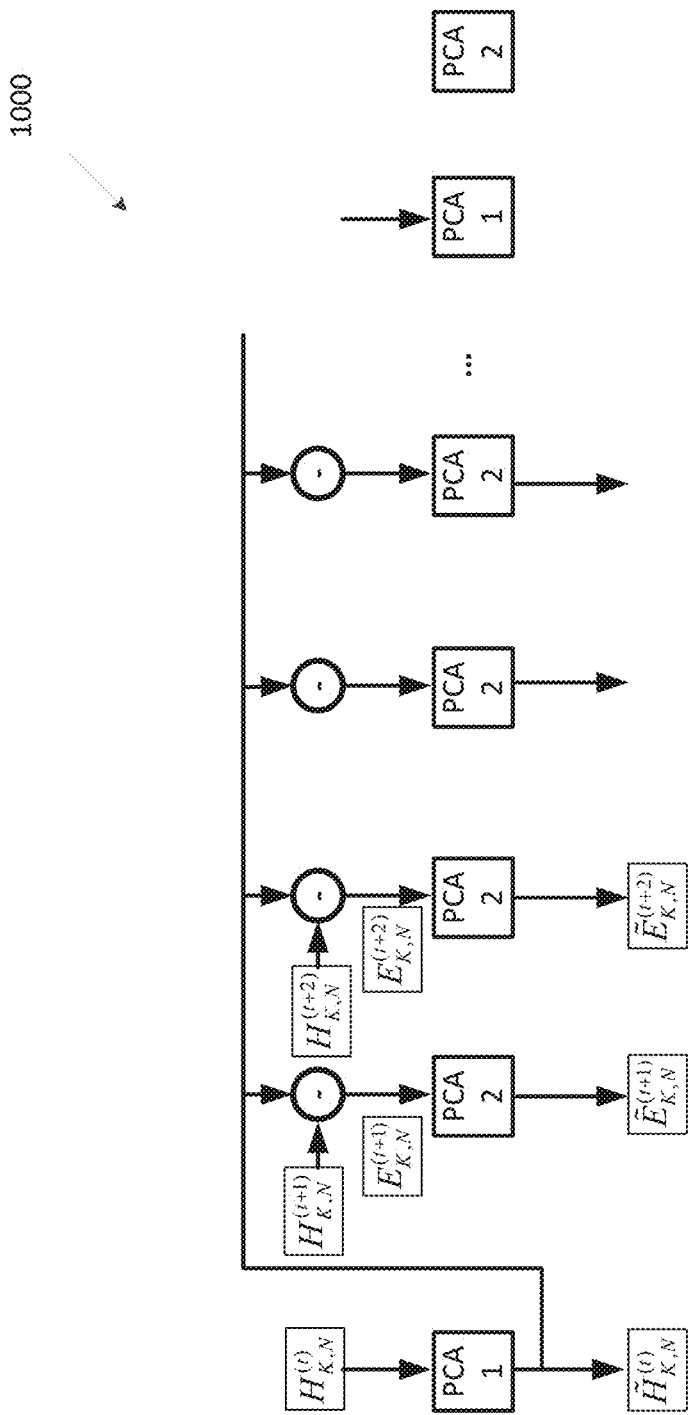
FIG. 10 illustrates an example differential PCA in a time domain according to embodiments of the present disclosure.

FIG. 10 illustrates an example differential PCA 1000 in a time domain according to embodiments of the present disclosure. An embodiment of the differential PCA 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

In some embodiments 4, a UE is configured to report explicit CSI using a differential or multi-stage compression techniques such as "differential PCA" in order to exploit correlation in spatial (across antennas) or/and frequency (across SBs) or/and time (across subframes) domains. An example of differential PCA is shown in FIG. 10 in which the explicit CSI is reported using a two stage differential PCA where differential PCA is considered in time domain. In one example of PCA1, at time (or subframe) t, the first stage PCA with $d_1$ principal components is applied to compress $H_{K,N}^{(t)}$. The first stage PCA exploits correlation across SBs and antenna ports. A few example values of $d_1$ is 1, 2, and 4. Note that PCA1 is an example of the base or coarse layer of a multi-stage or multi-layer or multi-resolution compression scheme. In another example of PCA 2, at time (or subframe)>t+n, n=1, 2, . . . , the second PCA with $d_2$ principal components is applied to compress $E_{K,N}^{(t+n)} = H_{K,N}^{(t+n)} - H_{K,N}^{(t)}$. The second stage PCA exploits correlation across time in addition to across SBs and antenna ports. A few example values of $d_2$ is 1, . . . , $d_1$. Note that PCA2 is an example of the refinement layer of a multi-stage or multi-layer or multi-resolution compression scheme.

At least one or a combination of the following example is adopted to configure $d_1$ and $d_2$ to the UE. In one example, both $d_1$ and $d_2$ are configured to the UE. In another example, both $d_1$ and $d_2$ are reported by the UE in the CSI report. In another example, both $d_1$ and $d_2$ are fixed in the specification. For example, $d_1$ is fixed to 2, and $d_2$ is fixed to 1. In yet another example, one of $d_1$ and $d_2$ is configured and the other is fixed. For example, $d_1$ is configured and $d_2$ is fixed to 1. In yet another example, one of $d_1$ and $d_2$ is configured and the other is reported by the UE. For example, $d_1$ is configured and $d_2$ is reported by the UE.

In some embodiments 4-0, to reduce overhead, left and right principal components ($U_{d_2}$ and $V_{d_2}$) of PCA2 are derived/reported separately. For example, left and right principal components are reported in alternative CSI reporting instances.

In some embodiments 4-1, a UE is configured with explicit CSI reporting based on a two stage differential PCA (FIG. 10) according to one of the three reporting configurations in TABLE 1. In one example of reporting configuration 0, both $1^{st}$ (base or coarse) and $2^{nd}$ (refinement) explicit CSIs are reported periodically, for example using PUCCH. In another example of reporting configuration 1, $1^{st}$ (base or coarse) explicit CSI is reported aperiodically, for example using PUSCH, and $2^{nd}$ (refinement) explicit CSI is reported periodically, for example, using PUCCH. In yet another example of reporting configuration 2, both $1^{st}$ (base or coarse) and $2^{nd}$ (refinement) explicit CSIs are reported aperiodically, for example using PUSCH.

TABLE 1

Differential PCA based explicit CSI reporting

| Reporting configuration | $1^{st}$ explicit CSI reporting (base or coarse layer) | $2^{nd}$ explicit CSI reporting (refinement layer) |
| --- | --- | --- |
| 0 | periodic | periodic |
| 1 | aperiodic | periodic |
| 2 | aperiodic (base) | aperiodic (refinement) |

Figure 11:
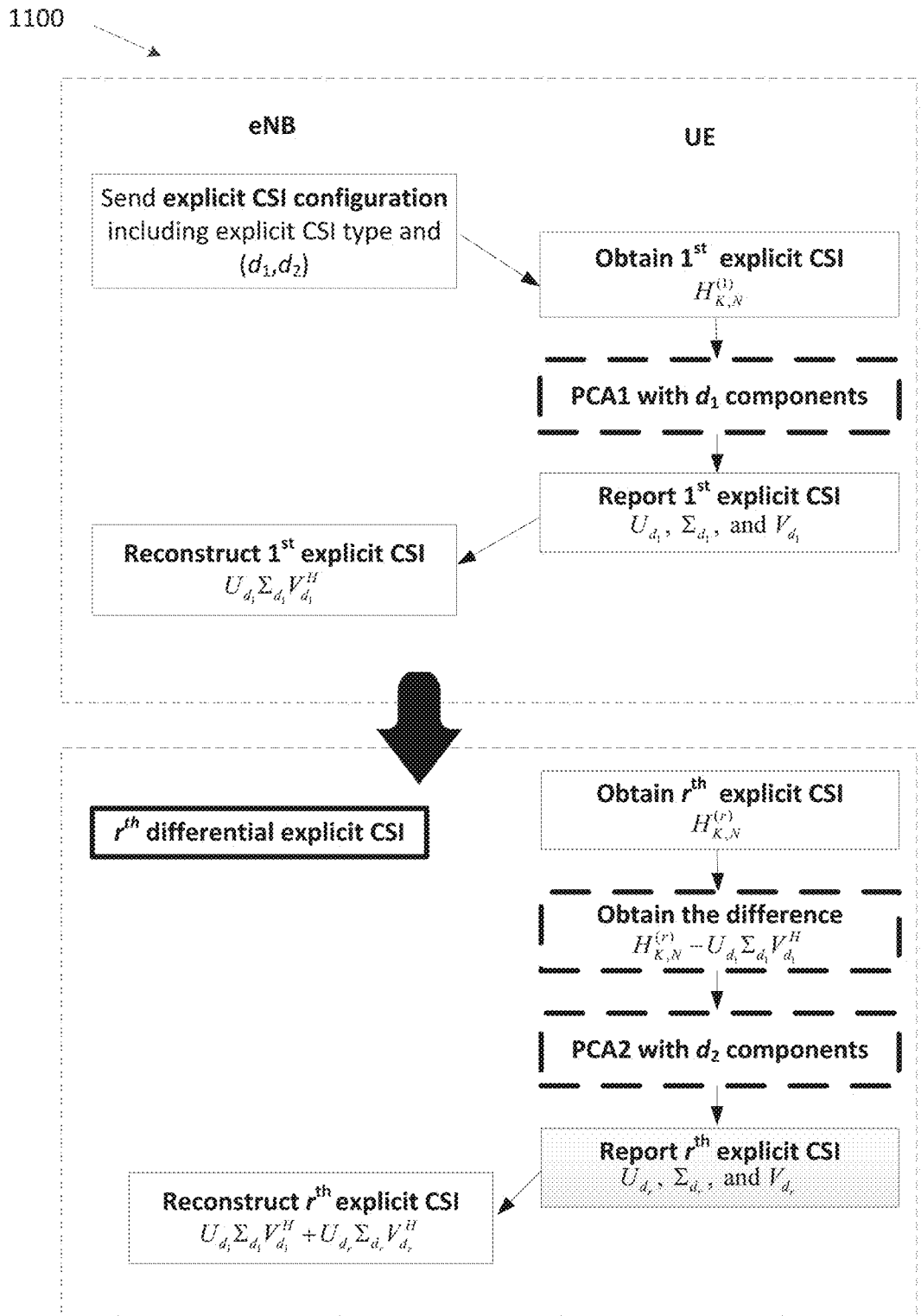
FIG. 11 illustrates an example differential PCA based explicit CSI feedback reporting according to embodiments of the present disclosure.

FIG. 11 illustrates an example differential PCA 1100 based explicit CSI feedback reporting according to embodiments of the present disclosure. An embodiment of the differential PCA 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In some embodiments 4-2, the explicit CSI reporting according to the proposed differential PCA based explicit CSI compression is shown in FIG. 11. The eNB (or gNB) sends the explicit CSI configuration to the UE which includes the explicit CSI type (channel, eigenvector, covariance matrix) and the number of principal components ($d_1$ and $d_2$ values). In response: the UE, at step 0, derives $1^{st}$ explicit CSI (base or coarse) of the configured type for each SB in which the UE is configured to report explicit CSI; the UE, at step 1, constructs the $1^{st}$ explicit CSI matrix $H_{K,N}^{(t)}$ as explained in the aforementioned embodiments 1; the UE, at step 2, applies PCA1 to obtain $d_1$ principal components $U_{d_1}$, $V_{d_1}$, and $\Sigma_{d_1}$; and the UE, at step 3, quantizes (using a codebook) and reports $d_1$ principal components for $1^{st}$ explicit CSI reporting.

The eNB (or gNB) reconstructs the 1$^{st}$ explicit CSI for K SBs as $H_{K,N}^{(t)}=U_{d_1}\Sigma_{d_1}V_{d_1}^H$. To report subsequent r-th, where r>1, explicit CSI, the UE first derives the differential explicit CSI matrix $H_{K,N}^{(r)}-U_{d_1}\Sigma_{d_1}V_{d_1}^H$ and repeats Steps 0-3 above with replacing PCA1 with PCA2 with $d_2$ principal components. The eNB (or gNB) reconstructs the r-th explicit CSI for K SBs as $H_{K,N}^{(t+r)}=U_{d_1}\Sigma_{d_1}V_{d_1}^H+U_{d_2}\Sigma_{d_2}V_{d_2}^H$.

Figure 12:
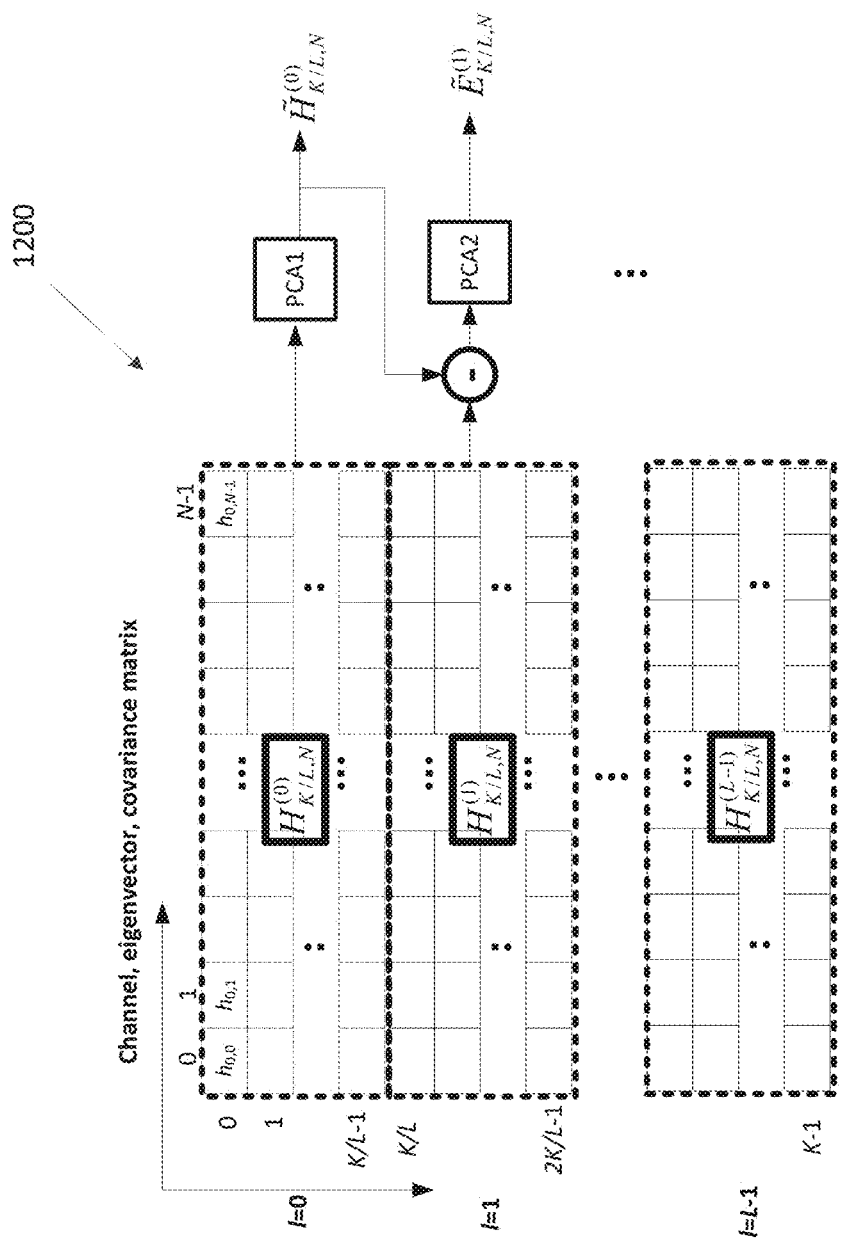
FIG. 12 illustrates an example differential PCA across SBs according to embodiments of the present disclosure.

FIG. 12 illustrates an example differential PCA 1200 across SBs according to embodiments of the present disclosure. An embodiment of the differential PCA 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In some embodiments 5, a UE is configured to report explicit CSI using differential PCA across SBs. For instance, K SBs is partitioned into L groups each with K/L consecutive SBs (where we assume that L divides K) and differential PCA is applied across l=0, 1, . . . , L−1 groups of SBs. An example of such differential PCA is shown in FIG. 12. Let K/L×N explicit CSI matrix for SB group l is denoted as $H_{K/L,N}^{(l)}$. In the figure, L SB groups are shown in bold dotted rectangles. The differential PCA is applied is follows. In one example of PCA1, the first stage PCA with $d_1$ principal components is applied to compress $H_{K/L,N}^{(0)}$ for SB group l=0. The first stage PCA exploits correlation across SBs in group l=0 and antenna ports. A few example values of $d_1$ is 1, 2, and 4. In another example of PCA2, the second PCA with $d_2$ principal components is applied to compress $E_{K/L,N}^{(l)}=H_{K/L,N}^{(l)}-H_{K/L,N}^{(0)}$ for SB group l>0. The second stage PCA exploits correlation SB groups in addition to across SBs and antenna ports. A few example values of $d_2$ is 1, . . . , $d_1$.

In some embodiments 5-0, the number of SB groups L=K, i.e., each SB group comprise of a single SB. In this case, PCA1 is used for explicit CSI reporting of SB 0, and PCA2 is used for explicit CSI reporting of SBs 1, 2, . . . , K−1.

In some embodiments 5-1, instead of across SB groups l=0, 1, . . . , L−1, the differential PCA is applied within each SB group. For example, for SB group l=0 (FIG. 12), PCA1 is used for explicit CSI reporting of SB 0, and PCA2 is used for explicit CSI reporting of SBs 1, 2, . . . , K/L−1. For SB group l=1 (FIG. 12), PCA1 is used for explicit CSI reporting of SB K/L, and PCA2 is used for explicit CSI reporting of SBs K/L, . . . , 2K/L−1. This continues for SB groups 3, . . . L−1.

In some embodiments 5-2, the differential PCA is applied across both time (subframes) and frequency (SBs) by extending the embodiments on differential PCA across time and the embodiments on differential PCA across frequency.

Figure 13:
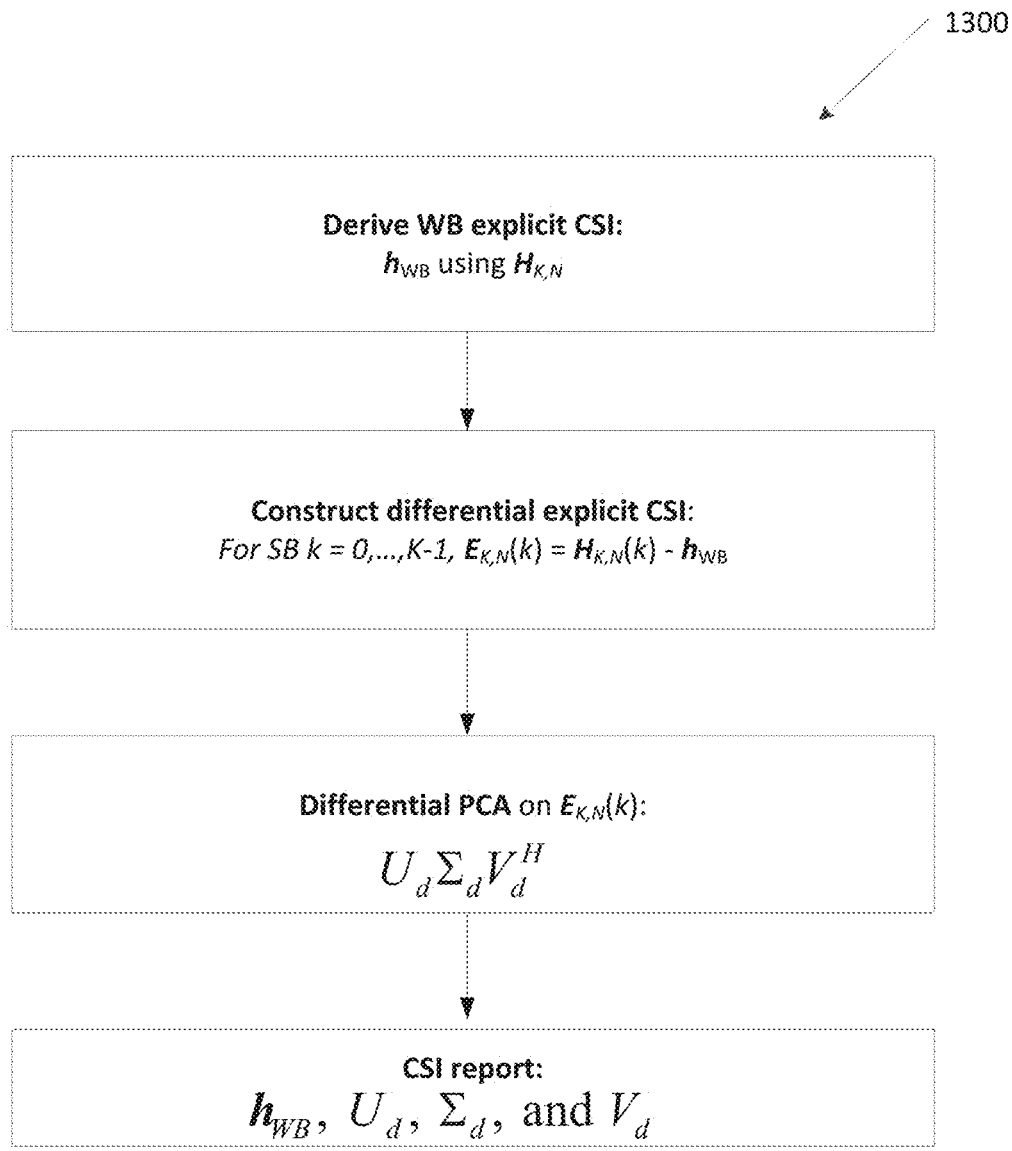
FIG. 13 illustrates example differential PCA based on WB explicit CSI according to embodiments of the present disclosure.

FIG. 13 illustrates example differential PCA 1300 based on WB explicit CSI according to embodiments of the present disclosure. An embodiment of the differential PCA 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

In some embodiment 6, a UE is configured to report explicit CSI using differential PCA across SBs where differential is applied with respect to a WB explicit CSI report $h_{WB}$. An example of such explicit CSI reporting is shown in FIG. 13. In one example, the UE derives the WB component of explicit CSI, $h_{WB}$, using the explicit CSI matrix $H_{K,N}$; constructs the differential explicit CSI $E_{K,N}$, which is an K×N matrix whose k-th row, $E_{K,N}(k)$, is constructed by subtracting $h_{WB}$ from the explicit CSI for SB k, i.e., $E_{K,N}(k)=H_{K,N}(k)-h_{WB}$; applies differential PCA on $E_{K,N}\approx \tilde{E}_{K,N}=U_d\Sigma_d V_d^H$; and finally reports quantized $h_{WB}$ and $U_d$, $\Sigma_d$, and $V_d^H$.

The eNB reconstructs the explicit CSI matrix as $\tilde{H}_{K,N}$, whose k-th row, $\tilde{H}_{K,N}(k)$, is constructed by adding $h_{WB}$ to the k-th row of $\tilde{E}_{K,N}=U_d\Sigma_d V_d^H$, i.e., $\tilde{H}_{K,N}(k)=\tilde{E}_{K,N}(k)+h_{WB}$.

In some embodiments 6-0, a UE is configured to report explicit CSI using differential PCA in the aforementioned embodiments 6 where differential PCA is applied to each of L SB groups, each with K/L consecutive SBs (where we assume that L divides K). In this case, the UE reports $h_{WB}^{(l)}$ and $\tilde{E}_{K,N}^{(l)}$ for each of l=0, 1, . . . , L−1 SB groups.

In some embodiment 7, a UE is configured to report explicit CSI using differential PCA where differential is in spatial domain across antenna ports. For instance, the total ($2N_1N_2$) antenna ports can be partitioned into P partial antenna ports each with $2N_1N_2/P$. The explicit CSI for 1$^{st}$ partial antenna port (partition 0) is reported using PCA1 with $d_1$ principal components, and that for p-th (where p>1) partial antenna port (partition p−1) is reported using PCA2 with $d_2$ principal components, where PCA1 and PCA2 area according to some embodiments of this disclosure.

In some embodiments 8, a UE is configured to first perform a dimension reduction from $2N_1N_2$ to L spatial channel coefficients, and then apply PCA based compression of L channel coefficients according to some embodiments of this disclosure.

In some embodiments 9, a UE is configured to report explicit CSI based on PCA compression proposed in some embodiments of this disclosure for a multi-panel antenna array at the eNB.

Figure 14:
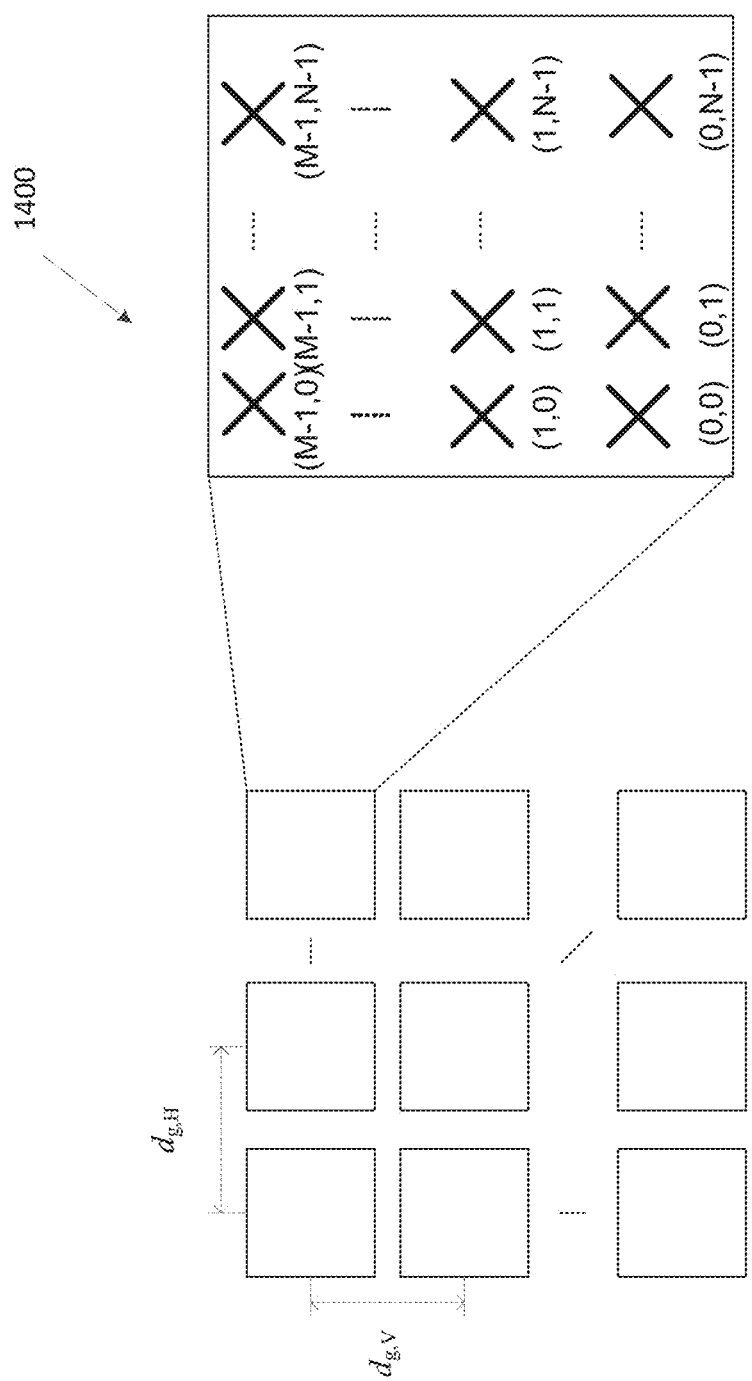
FIG. 14 illustrates an example multi-panel antenna model according to embodiments of the present disclosure.

FIG. 14 illustrates an example multi-panel antenna model 1400 according to embodiments of the present disclosure. An embodiment of the multi-panel antenna model 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

BS antenna model is a uniform rectangular panel array, comprising $M_gN_g$ panels, as illustrated in FIG. 14. $M_g$ is number of panels in a column. $N_g$ is number of panels in a row. Antenna panels are uniformly spaced in the horizontal direction with a spacing of $d_{g,H}$ and in the vertical direction with a spacing of $d_{g,V}$. On each antenna panel, antenna elements are placed in the vertical and horizontal direction, where N is the number of columns, M is the number of antenna elements with the same polarization in each column.

Antenna numbering on the panel illustrated in FIG. 14 assumes observation of the antenna array from the front (with x-axis pointing towards broad-side and increasing y-coordinate for increasing column number). The antenna elements are uniformly spaced in the horizontal direction with a spacing of $d_H$ and in the vertical direction with a spacing of $d_V$. The antenna panel is either single polarized (P=1) or dual polarized (P=2).

In some embodiments 9-0, a UE is configured to report explicit CSI (i.e., $H_{K,N}$ for base layer PCA or/and $E_{K,N}$ for differential PCA) for each antenna panel separately, where the explicit CSI for a panel is reported based on PCA compression according to one or a combination of the aforementioned embodiments 0-8 of this disclosure. Note that N is the number of explicit CSI components for each panel.

In some embodiments 9-1, a UE is configured to report explicit CSI (i.e., $H_{K,N}$ for base layer PCA or/and $E_{K,N}$ for differential PCA) for D antenna panels jointly, where $d_{g,H} \times d_{g,V} \geq D > 1$ and the explicit CSI for D panels is reported based on PCA compression according to one or a combination of the aforementioned embodiments 0-8 of this disclosure. Note that N is the number of explicit CSI components for D panels. A few examples of such explicit CSI reporting are as follows. In one example, $D = d_{g,H} \times d_{g,V}$ (i.e. all antenna panels) and the UE is configured to report explicit CSI for all antenna panels jointly. In another example, $D = d_{g,H}$ (i.e. all antenna panels in horizontal direction) and the UE is configured to report explicit CSI for all horizontal antenna panels jointly. In yet another example, $D = d_{g,V}$ (i.e. all antenna panels in vertical direction) and the UE is configured to report explicit CSI for all vertical antenna panels jointly. In yet another example, $D = 2 \times 2$ (i.e. 4 adjacent antenna panels forming a square) and the UE is configured to report explicit CSI for 2×2 antenna panels jointly.

In some embodiments 9-2, a UE is configured to report explicit CSI of all antenna ($d_{g,H} \times d_{g,V}$) panels by considering differential PCA across antenna panels where, for example, the differential PCA is considered with respect to the antenna panel located at (0,0). In other words, if (h, v) is the index of an antenna panel in two-dimension, where h=0, 1, ..., $d_{g,H}$ and v=0, 1, ..., $d_{g,V}$, then the explicit CSI for the antenna panel (0,0) is reported using PCA1 with $d_1$ principal components and that for the antenna panels (h, v), where either h≠0 or v≠0, is reported using PCA2 with $d_2$ principal components. The details about the configuration and CSI reporting of the differential PCA across multiple antenna panels are according to some embodiments of this disclosure.

Figure 15:
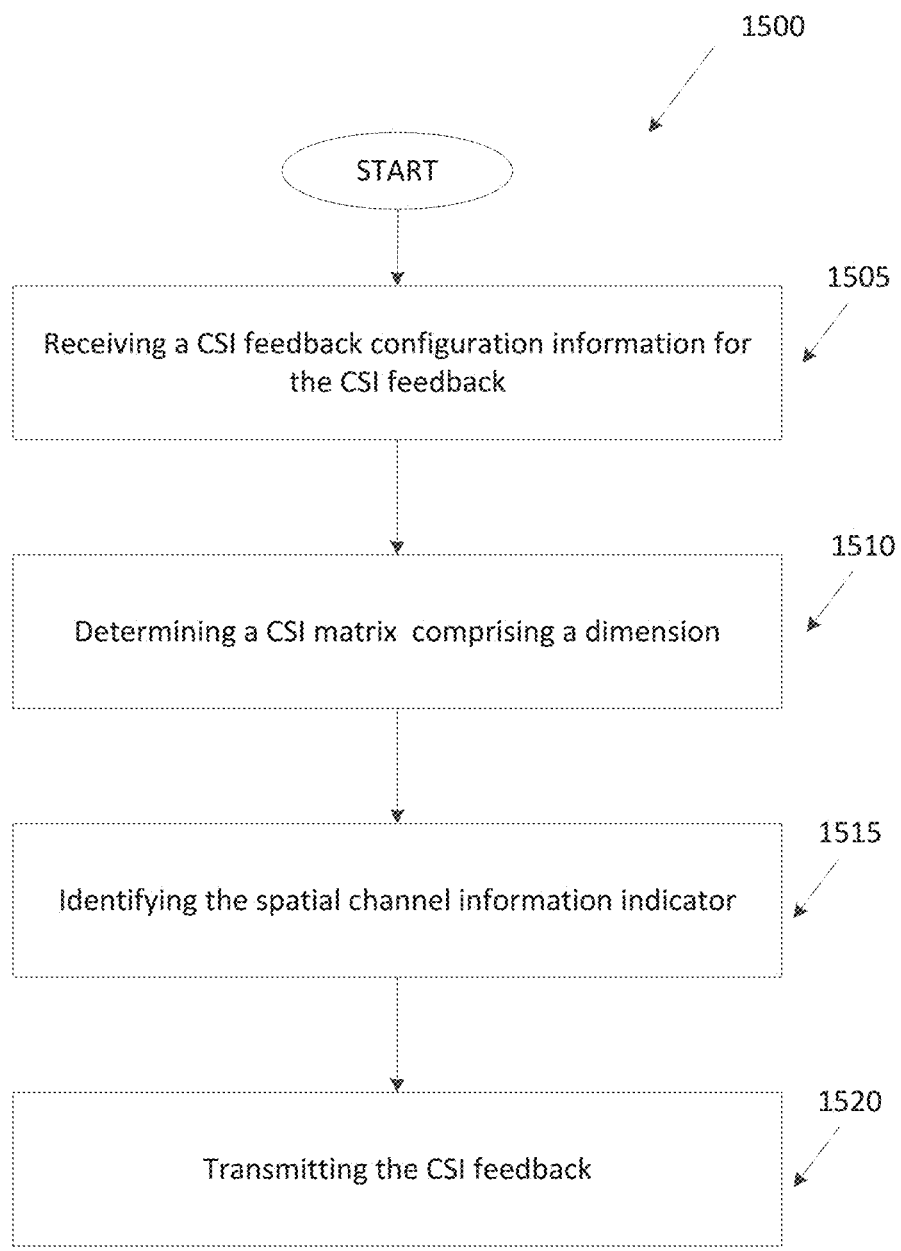
FIG. 15 illustrates an example flow chart of a method for enabling channel compression according to embodiments of the present disclosure.

FIG. 15 illustrates an example flow chart of a method 1500 for enabling channel compression according to embodiments of the present disclosure, as may be performed by a UE (e.g., 111-116 as illustrated in FIG. 1). An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As shown in FIG. 15, the method 1500 begins at step 1505. In step 1505, the UE receives CSI feedback configuration information for the CSI feedback including a spatial channel information indicator for each subband (SB). In step 1505, the spatial channel information indicator comprises at least one of a downlink channel matrix, a covariance matrix of the downlink channel matrix, or an eigenvector of the covariance matrix of the downlink channel matrix.

Next, the UE in step 1510 determines a CSI matrix $H_{K,N}$ comprising a dimension K×N based on the CSI feedback configuration information. In this step 1510, K indicates a number of SBs and N indicates a number of components of the spatial channel information indicator.

Subsequently, the UE in step 1515 identifies the spatial channel information indicator based on the CSI matrix $H_{K,N}$. In step 1515, the spatial channel information indicator indicates: a matrix $U_d = [u_0 \ u_1 \ ... \ u_{d-1}]$ comprising d column vectors of dimension K×1; a matrix $V_d = [v_0 \ v_1 \ ... \ v_{d-1}]$ comprising d column vectors of dimension N×1; and a diagonal matrix $$\sum_d = \begin{bmatrix} \sigma_0 & 0 & ... & 0 \\ 0 & \sigma_1 & ... & 0 \\ \vdots & \vdots & \ddots & 0 \\ 0 & 0 & ... & \sigma_{d-1} \end{bmatrix}$$

comprising d non-negative real numbers $\sigma_0, \sigma_1, ..., \sigma_{d-1}$ as diagonal elements. In step 1515, the d is a positive integer that is either a predetermined value or configured by the BS via CSI feedback configuration information or reported by the UE in the CSI feedback, and wherein the d is determined in a range given by $1 \leq d < D$, where the D is determined as D=min(K, N).

In some embodiments, the UE in step 1515 further identifies the spatial channel information indicator based on a set of d triples $\{(u_i, v_i, \sigma_i): 0 \leq i \leq d-1\}$ where $u_i$ is an eigenvector associated with an (i+1)-th largest eigenvalue of a matrix $H_{K,N} H_{K,N}^H$, $u_i$ is an eigenvector associated with an (i+1)-th largest eigenvalue of a matrix $H_{K,N}^H H_{K,N}, k_N H_K$, and $\sigma_i$ is a squared-root of the (i+1)-th largest eigenvalue of $H_{K,N} H_{K,N}^H$ or $H_{K,N}^H H_{K,N}$. In such embodiments, the CSI matrix $H_{K,N}$ is represented based on an equation given by $H_{K,N} \cong \tilde{H}_{K,N} = \sum_{i=0}^{d-1} \sigma_i u_i v_i^H$.

In some embodiments, the UE in step 1515 identifies the spatial channel information indicator based on a set of d pairs $\{(w_i, \sigma_i): 0 \leq i \leq d-1\}$ where $w_i = \text{vec}(u_i v_i^H)$ is a column vector of a dimension KN×1, and $\sigma_i$ is a non-negative real number. In such embodiments, a vector form of the CSI matrix $H_{K,N}$, $h = \text{vec}(H_{K,N})$ is represented based on an equation given by $h \cong \tilde{h} = \sum_{i=0}^{d-1} \sigma_i w_i$, where a notation vec(X) denotes a column vector that is constructed by concatenating columns of a matrix X into a single column.

In some embodiments, the UE in step 1515 identifies the spatial channel information indicator based on a triple of matrices $(U_d, V_d, \Sigma_d)$. In such embodiments, the CSI matrix $H_{K,N}$ is represented based on an equation given by $H_{K,N} \cong \tilde{H}_{K,N} = U_d \Sigma_d V_d^H$.

In some embodiments, the UE in step 1515 identifies the spatial channel information indicator based on a codebook for at least one of $U_d$, $V_d$, or $\Sigma_d$.

In some embodiments, the UE in step 1515 identifies a first spatial channel information indicator indicating a first triple of matrices, $U_{d_1}$, $V_{d_1}$, and $\Sigma_{d_1}$ based on a first CSI matrix $H_{K,N}^{(1)}$.

In some embodiments, the UE in step 1515 identifies a second spatial channel information indicator indicating a second triple of matrices, $U_{d_2}$, $V_{d_2}$, and $\Sigma_{d_2}$ based on a difference $H_{K,N}^{(2)} - \tilde{H}_{K,N}^{(1)}$ between a second CSI matrix $H_{K,N}^{(2)}$ and a representation $H_{K,N}^{(1)}$ of the first CSI matrix $H_{K,N}^{(1)}$ according to the first spatial channel information indicator. In such embodiments, the difference is determined in at least one of a time domain or a frequency domain, and $(d_1, d_2)$ satisfies $d_1 \geq d_2$, and wherein at least one of $d_1$ or $d_2$ is configured by either a predetermined value or the BS via CSI feedback configuration information, or reported by the UE in the CSI feedback;

Finally, the UE in step 1520 transmits the CSI feedback including the spatial channel information indicator indicating $U_d$, $V_d$, and $\Sigma_d$ over an uplink channel.

In some embodiment, the UE in step 1520 transmits a first CSI feedback including the first spatial channel information indicator indicating $U_{d_1}, V_{d_1}$, and $\Sigma_{d_1}$.

In some embodiments, the UE in step 1520 transmits, to the BS over either the first uplink channel or a second uplink channel, a second CSI feedback including the second spatial channel information indicator indicating $U_{d_2}$, $V_{d_2}$, and $\Sigma_{d_2}$.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for a channel state information (CSI) feedback in a wireless communication system, the UE comprising:
    a transceiver configured to receive, from a base station (BS), CSI feedback configuration information for the CSI feedback including a spatial channel information (SCI) indicator for each subband (SB), wherein the SCI indicator indicates a SCI associated with a downlink (DL) channel matrix;
    at least one processor configured to:
        determine a CSI matrix $H_{K,N}$ comprising a dimension K×N based on the CSI feedback configuration information, where K indicates a number of SBs and N indicates a number of components of the SCI; and
        identify, based on the CSI matrix $H_{K,N}$, the SCI indicator that indicates a first set of d basis vectors comprising a dimension K×1, a second set of d basis vectors comprising a dimension N×1, and a set of d coefficients, wherein
    the transceiver is further configured to transmit, to the BS, the CSI feedback including the identified SCI indicator indicating the first set of d basis vectors, the second set of d basis vectors, and the set of d coefficients over an uplink channel.

2. The UE of claim 1, wherein the SCI associated with the DL channel matrix comprises at least one of the DL channel matrix itself, a covariance matrix of the DL channel matrix, or at least one eigenvector of the covariance matrix of the DL channel matrix, and wherein:
    the first set of d basis vectors comprises columns of a matrix $U_d = [u_0 \; u_1 \; \ldots \; u_{d-1}]$;
    the second set of d basis vectors comprises columns of a matrix $V_d = [v_0 \; v_1 \; \ldots \; v_{d-1}]$; and
    the set of d coefficients correspond to diagonal elements of a diagonal matrix $$\sum_d = \begin{bmatrix} \sigma_0 & 0 & \ldots & 0 \\ 0 & \sigma_1 & \ldots & 0 \\ \vdots & \vdots & \ddots & 0 \\ 0 & 0 & \ldots & \sigma_{d-1} \end{bmatrix}$$

where $\sigma_0, \sigma_1, \ldots, \sigma_{d-1}$ are non-negative real numbers.

3. The UE of claim 2, wherein the at least one processor is further configured to identify the SCI indicator based on a set of d triples $\{(u_i, v_i, \sigma_i); 0 \leq i \leq d-1\}$ where $u_i$ is an eigenvector associated with an (i+1)-th largest eigenvalue of a matrix $H_{K,N} H_{K,N}^H$, $u_i$ is an eigenvector associated with an (i+1)-th largest eigenvalue of a matrix $H_{K,N}^H H_{K,N}$, and $\sigma_i$ is a squared-root of the (i+1)-th largest eigenvalue of $H_{K,N} H_{K,N}^H$ or $H_{K,N}^H H_{K,N}$, and wherein the CSI matrix $H_{K,N}$ is represented based on an equation given by $H_{K,N} \cong \tilde{H}_{K,N} = \sum_{i=0}^{d-1} \sigma_i u_i v_i^H$.

4. The UE of claim 2, wherein the at least one processor is further configured to identify the SCI indicator based on a set of d pairs $\{(w_i, \sigma_i); 0 \leq i \leq d-1\}$ where $w_i = \text{vec}(u_i v_i^H)$ is a column vector of a dimension KN×1, and $\sigma_i$ is a non-negative real number, and wherein a vector form of the CSI matrix $H_{K,N}$, $h = \text{vec}(H_{K,N})$ is represented based on an equation given by $h \cong \tilde{h} = \sum_{i=0}^{d-1} \sigma_i w_i$ where a notation vec(X) denotes a column vector that is constructed by concatenating columns of a matrix X into a single column.

5. The UE of claim 1, wherein the d is a positive integer that is either a predetermined value or configured by the BS via CSI feedback configuration information or reported by the UE in the CSI feedback, and wherein the d is determined in a range given by $1 \leq d \leq D$ where the D is determined as D=min(K,N).

6. The UE of claim 2, whether the at least one processor is further configured to identify the SCI indicator based on a codebook for at least one of $U_d$, $V_d$, or $\Sigma_d$.

7. The UE of claim 2 wherein the at least one processor is further configured to:
    identify a first SCI indicator indicating a first triple of matrices, $U_{d_1}$, $V_{d_1}$, and $\Sigma_{d_1}$, based on a first CSI matrix $H_{K,N}^{(1)}$; and
    identify a second SCI indicator indicating a second triple of matrices, $U_{d_2}$, $V_{d_2}$, and $\Sigma_{d_2}$, based on a difference $H_{K,N}^{(2)} - \tilde{H}_{K,N}^{(1)}$ between a second CSI matrix $H_{K,N}^{(2)}$ and a representation $\tilde{H}_{K,N}^{(1)}$ of the first CSI matrix $H_{K,N}^{(1)}$ according to the first SCI indicator,
    wherein the difference is determined in at least one of a time domain or a frequency domain and $(d_1, d_2)$ satisfies $d_1 \geq d_2$, wherein at least one of $d_1$ or $d_2$ is determined by either a predetermined value or the BS via CSI feedback configuration information, or the UE in the CSI feedback, and wherein
    the transceiver is further configured to:
        transmit, to the BS, a first CSI feedback including the first SCI indicator indicating $U_{d_1}$, $V_{d_1}$, and $\Sigma_{d_1}$ over a first uplink channel; and
        transmit, to the BS, a second CSI feedback including the second SCI indicator indicating $U_{d_2}$, $V_{d_2}$, and $\Sigma_{d_2}$ over at least one of the first uplink channel or a second uplink channel.

8. A base station (BS) for a channel state information (CSI) feedback in a wireless communication system, the BS comprising:
    a transceiver configured to:
        transmit, to a user equipment (UE), CSI feedback configuration information for the CSI feedback including a spatial channel information (SCI) indicator for each subband (SB), wherein the SCI indicator indicates a SCI associated with a downlink (DL) channel matrix; and
        receive, from the UE, the CSI feedback including the identified SCI indicator indicating a first set of d basis vectors comprising a dimension K×1, a second set of d basis vectors comprising a dimension N×1, and a set of d coefficients over an uplink channel,
    at least one processor configured to:
        represent a CSI matrix $H_{K,N}$ using the first set of d basis vectors, the second set of d basis vectors, and the set of d coefficients, indicated by the SCI indicator, wherein the CSI matrix $H_{K,N}$ comprises a dimension K×N based on the CSI feedback configuration information, where K indicates a number of SBs and N indicates a number of components of the SCI.

9. The BS of claim 8, wherein the SCI associated with the DL channel matrix comprises at least one of the DL channel matrix itself, a covariance matrix of the DL channel matrix, or at least one an eigenvector of the covariance matrix of the DL channel matrix, and wherein:
the first set of d basis vectors comprises columns of a matrix $U_d=[u_0 \, u_1 \, \ldots \, u_{d-1}]$;
the second set of d basis vectors comprises columns of a matrix $V_d=[v_0 \, v_1 \, \ldots \, v_{d-1}]$; and
the set of d coefficients correspond to diagonal elements of a diagonal matrix $$\sum_d = \begin{bmatrix} \sigma_0 & 0 & \ldots & 0 \\ 0 & \sigma_1 & \ldots & 0 \\ \vdots & \vdots & \ddots & 0 \\ 0 & 0 & \ldots & \sigma_{d-1} \end{bmatrix}$$

where $\sigma_0, \sigma_1, \ldots, \sigma_{d-1}$ are non-negative real numbers.

10. The BS of claim 9, wherein the SCI indicator is identified based on a set of d triples $\{(u_i,v_i,\sigma_i); 0 \leq i \leq d-1\}$ where $u_i$ is an eigenvector associated with an (i+1)-th largest eigenvalue of a matrix $H_{K,N}H_{K,N}^H$, $u_i$ is an eigenvector associated with an (i+1)-th largest eigenvalue of a matrix $H_{K,N}^H H_{K,N}$, and $\sigma_i$ is a squared-root of the (i+1)-th largest eigenvalue of $H_{K,N}H_{K,N}^H$ or $H_{K,N}^H H_{K,N}$, and wherein the CSI matrix $H_{K,N}$ is represented based on an equation given by $H_{K,N} \cong \tilde{H}_{K,N} = \Sigma_{i=0}^{d-1} \sigma_i u_i v_i^H$.

11. The BS of claim 9, wherein the SCI indicator is identified based on a set of d pairs $\{(w_i,\sigma_i); 0 \leq i \leq d-1\}$ where $w_i = \text{vec}(u_i v_i^H)$ is a column vector of a dimension KN×1, and $\sigma_i$ is a non-negative real number, and wherein a vector form of the CSI matrix $H_{K,N}$, $h=\text{vec}(H_{K,N})$, is represented based on an equation given by $h \cong \tilde{h} = \Sigma_{i=0}^{d-1} \sigma_i w_i$, where a notation vec(X) denotes a column vector that is constructed by concatenating columns of a matrix X into a single column.

12. The BS of claim 8, wherein the d is a positive integer that is either a predetermined value or configured by the BS via CSI feedback configuration information or reported by the UE in the CSI feedback, and wherein the d is determined in a range given by $1 \leq d < D$ where the D is determined as D=min(K,N).

13. The BS of claim 9, wherein the transceiver is further configured to:
receive, from the UE, a first CSI feedback including the first SCI indicator indicating $U_{d_1}$, $V_{d_1}$, and $\Sigma_{d_1}$ over a first uplink channel; and
receive, from the UE, a second CSI feedback including a second SCI indicator indicating $U_{d_2}$, $V_{d_2}$, and $\Sigma_{d_2}$ over at least one of the first uplink channel or a second uplink channel, and wherein
the at least one processor is further configured to:
represent a first CSI matrix $H_{K,N}^{(1)}$ using the first SCI indicator indicating $U_{d_1}$, $V_{d_1}$, and $\Sigma_{d_1}$; and
represent a difference $H_{K,N}^{(2)} - \tilde{H}_{K,N}^{(1)}$ between a second CSI matrix $H_{K,N}^{(2)}$ and a representation $\tilde{H}_{K,N}^{(1)}$ of the first CSI matrix $H_{K,N}^{(1)}$ according to the first SCI indicator using the second SCI indicator indicating $U_{d_2}$, $V_{d_2}$, and $\Sigma_{d_2}$,
wherein the difference is determined in at least one of a time domain or a frequency domain, and $(d_1,d_2)$ satisfies $d_1 \geq d_2$, wherein at least one of $d_1$ or $d_2$ is configured by either a predetermined value or the BS via CSI feedback configuration information, or the UE in the CSI feedback.

14. A method of a user equipment (UE) for a channel state information (CSI) feedback in a wireless communication system, the method comprising:
receiving, from a base station (BS), CSI feedback configuration information for the CSI feedback including a spatial channel information (SCI) indicator for each subband (SB), wherein the SCI indicator indicates a SCI associated with a downlink (DL) channel matrix;
determining a CSI matrix $H_{K,N}$ comprising a dimension K×N based on the CSI feedback configuration information, where K indicates a number of SBs and N indicates a number of components of the SCI;
identifying, based on the CSI matrix $H_{K,N}$, the SCI indicator that indicates a first set of d basis vectors comprising a dimension K×1, a second set of d basis vectors comprising a dimension N×1, and a set of d coefficients; and
transmitting, to the BS, the CSI feedback including the identified SCI indicator indicating the first set of d basis vectors, the second set of d basis vectors, and the set of d coefficients over an uplink channel.

15. The method of claim 14, wherein the SCI associated with the DL channel matrix comprises at least one of the DL channel matrix itself, a covariance matrix of the DL channel matrix, or at least one eigenvector of the covariance matrix of the DL channel matrix, and wherein:
the first set of d basis vectors comprises columns of a matrix $U_d=[u_0 \, u_1 \, \ldots \, u_{d-1}]$;
the second set of d basis vectors comprises columns of a matrix $V_d=[v_0 \, v_1 \, \ldots \, v_{d-1}]$; and
the set of d coefficients correspond to diagonal elements of a diagonal matrix $$\sum_d = \begin{bmatrix} \sigma_0 & 0 & \ldots & 0 \\ 0 & \sigma_1 & \ldots & 0 \\ \vdots & \vdots & \ddots & 0 \\ 0 & 0 & \ldots & \sigma_{d-1} \end{bmatrix}$$

where $\sigma_0, \sigma_1, \ldots, \sigma_{d-1}$ are non-negative real numbers.

16. The method of claim 15, further comprising identifying the SCI indicator based on a set of d triples $\{(u_i,v_i,\sigma_i); 0 \leq i \leq d-1\}$ where $u_i$ is an eigenvector associated with an (i+1)-th largest eigenvalue of a matrix $H_{K,N}H_{K,N}^H$, $u_i$ is an eigenvector associated with an (i+1)-th largest eigenvalue of a matrix $H_{K,N}^H H_{K,N}$, and $\sigma_i$ is a squared-root of the (i+1)-th largest eigenvalue of $H_{K,N}H_{K,N}^H$ or $H_{K,N}^H H_{K,N}$, wherein the CSI matrix $H_{K,N}$ is represented based on an equation given by $H_{K,N} \cong \tilde{H}_{K,N} = \Sigma_{i=0}^{d-1} \sigma_i u_i v_i^H$.

17. The method of claim 15, further comprising identifying the SCI indicator based on a set of d pairs $\{(w_i,\sigma_i); 0 \leq i \leq d-1\}$ where $w_i=\text{vec}(u_i v_i^H)$ is a column vector of a dimension KN×1, and $\sigma_i$ is a non-negative real number, wherein a vector form of the CSI matrix $H_{K,N}$, $h=\text{vec}(H_{K,N})$ is represented based on an equation given by $h \cong \tilde{h} = \Sigma_{i=0}^{d-1} \sigma_i w_i$ where a notation vec(X) denotes a column vector that is constructed by concatenating columns of a matrix X into a single column.

18. The method of claim 14, wherein the d is a positive integer that is either a predetermined value or configured by the BS via CSI feedback configuration information or reported by the UE in the CSI feedback, and wherein the d is determined in a range given by $1 \leq d < D$ where the D is determined as $D=\min(K,N)$.

19. The method of claim 15, further comprising identifying the SCI indicator based on a codebook for at least one of $u_d$, $V_d$, or $\Sigma_d$.

20. The method of claim 15, further comprising:
identifying a first SCI indicator indicating a first triple of matrices, $U_{d_1}$, $V_{d_1}$, and $\Sigma_{d_1}$ based on a first CSI matrix $H_{K,N}^{(1)}$;
identifying a second SCI indicator indicating a second triple of matrices, $U_{d_2}$, $V_{d_2}$, and $\Sigma_{d_2}$ based on a difference $H_{K,N}^{(2)} - \tilde{H}_{K,N}^{(1)}$ between a second CSI matrix $H_{K,N}^{(2)}$ and a representation $\tilde{H}_{K,N}^{(1)}$ of the first CSI matrix $H_{K,N}^{(1)}$ according to the first SCI indicator, wherein the difference is determined in at least one of a time domain or a frequency domain and $(d_1,d_2)$ satisfies $d_1 \geq d_2$, and wherein at least one of $d_1$ or $d_2$ is determined by either a predetermined value or the BS via CSI feedback configuration information, or the UE in the CSI feedback;
transmitting, to the BS, a first CSI feedback including the first SCI indicator indicating $U_{d_1}$, $V_{d_1}$, and $\Sigma_{d_1}$ over a first uplink channel; and
transmitting, to the BS, a second CSI feedback including the second SCI indicator indicating $u_{d_2}$, $V_{d_2}$, and $\Sigma_{d_2}$ over either the first uplink channel or a second uplink channel.

* * * * *